US009510251B2

(12) United States Patent
Sidhu et al.

(10) Patent No.: US 9,510,251 B2
(45) Date of Patent: Nov. 29, 2016

(54) CALL HANDOFF INITIATION IN HYBRID NETWORKS

(71) Applicant: Microsoft Corporation, Redmond, WA (US)

(72) Inventors: Gursharan S Sidhu, Seattle, WA (US); Thomas Kuehnel, Seattle, WA (US); Rao Salapaka, Sammamish, WA (US); Vishal Soni, Redmond, WA (US); Ranveer Chandra, Bellevue, WA (US); Mansoor Jafry, Kirkland, WA (US); Anish Desai, Bellevue, WA (US); Ruchir Astavans, Redmond, WA (US); Humayun Khan, Issaquah, WA (US); John Mark Miller, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/144,668

(22) Filed: Dec. 31, 2013

(65) Prior Publication Data
US 2015/0189556 A1  Jul. 2, 2015

(51) Int. Cl.
*H04W 36/00* (2009.01)
*H04W 36/14* (2009.01)

(52) U.S. Cl.
CPC ......... *H04W 36/0083* (2013.01); *H04W 36/14* (2013.01)

(58) Field of Classification Search
CPC ........... H04W 36/0083; H04W 36/14; H04W 36/30; H04W 36/32
USPC .................................................. 455/436–442
See application file for complete search history.

(56) References Cited

U.S. PATENT DOCUMENTS 6,148,206 A   11/2000  Karanja et al.
6,335,927 B1   1/2002  Elliott et al.
(Continued)

FOREIGN PATENT DOCUMENTS

CN   101656922 A   2/2010
EP      1432219 A1   6/2004
(Continued)

OTHER PUBLICATIONS

Whitwam, Ryan, "Republic Wireless Moto X Review: A Great Deal with Very Few Compromises", Published on: Dec. 4, 2013, Available at: http://www.androidpolice.com/2013/12/03/republic-wireless-moto-x-review-a-great-deal-with-very-few-compromises/ (12 pages total).
(Continued)

*Primary Examiner* — Sam Bhattacharya
(74) *Attorney, Agent, or Firm* — Brandon Roper; Judy Yee; Micky Minhas

(57) ABSTRACT

A continual learning process is applied to a class of risk estimate-based algorithms and associated risk thresholds used for deciding when to initiate a handoff between different types of network connections that are available to a mobile device having telephony functionality. The process is implemented as a virtuous loop providing ongoing tuning and adjustment to improve call handoff algorithms and risk thresholds so that handoffs can be performed with the goals of minimizing dropped calls and unacceptable degradation in call quality as well as avoiding premature handoffs. Device characteristics, environmental context, connection measurements, and outcomes of call handoff decisions are crowd-sourced from a population of mobile devices into a cloud-based handoff decision enabling service. The service evaluates potentially usable handoff decision algorithms and risk thresholds against archived crowd-sourced data to determine how they would have performed in real world situations and delivers improved algorithms and risk thresholds to the mobile devices.

14 Claims, 15 Drawing Sheets

(56) References Cited

U.S. PATENT DOCUMENTS

| | | |
|---|---|---|
| 6,343,220 B1 | 1/2002 | Van Der Salm |
| 6,490,449 B1 | 12/2002 | Thibert et al. |
| 6,518,957 B1 | 2/2003 | Lehtinen |
| 6,763,226 B1 | 7/2004 | McZeal, Jr. |
| 7,010,002 B2 | 3/2006 | Chow et al. |
| 7,110,750 B2 | 9/2006 | Oishi et al. |
| 7,411,911 B2 | 8/2008 | Huotari et al. |
| 7,483,984 B1 | 1/2009 | Jonker et al. |
| 7,631,270 B2 | 12/2009 | Cunningham et al. |
| 7,697,479 B2 | 4/2010 | Metke et al. |
| 7,706,291 B2 | 4/2010 | Luft et al. |
| 7,746,989 B2 | 6/2010 | Mazor |
| 7,796,998 B1 | 9/2010 | Zellner et al. |
| 7,830,863 B2 | 11/2010 | Biage et al. |
| 7,835,751 B2 | 11/2010 | Ibe |
| 7,894,807 B1 | 2/2011 | Drennan |
| 7,903,794 B1 | 3/2011 | Bales et al. |
| 7,986,943 B2 | 7/2011 | Bumiller |
| 7,995,565 B2 | 8/2011 | Buckley et al. |
| 8,000,710 B2 | 8/2011 | Jagadeesan et al. |
| 8,032,122 B2 | 10/2011 | Sigmund et al. |
| 8,126,465 B2 | 2/2012 | Lu et al. |
| 8,155,084 B2 | 4/2012 | Long et al. |
| 8,254,986 B2 | 8/2012 | Russell |
| 8,670,405 B1 | 3/2014 | Lee |
| 8,976,950 B2 | 3/2015 | Kramarenko |
| 9,001,787 B1 | 4/2015 | Conant |
| 2002/0059453 A1 | 5/2002 | Eriksson et al. |
| 2002/0146000 A1 | 10/2002 | Jonsson et al. |
| 2003/0231759 A1 | 12/2003 | Bedingfield, Sr. et al. |
| 2004/0047339 A1 | 3/2004 | Wang et al. |
| 2004/0121761 A1 | 6/2004 | Tripathy et al. |
| 2004/0203607 A1 | 10/2004 | Satapathy |
| 2004/0240430 A1 | 12/2004 | Lin et al. |
| 2005/0070291 A1 | 3/2005 | Shi |
| 2005/0186960 A1 | 8/2005 | Jiang |
| 2005/0249196 A1 | 11/2005 | Ansari et al. |
| 2005/0286466 A1 | 12/2005 | Tagg et al. |
| 2006/0029049 A1 | 2/2006 | Kobayashi et al. |
| 2006/0030357 A1 | 2/2006 | Jiang |
| 2006/0045069 A1 | 3/2006 | Zehavi et al. |
| 2006/0121902 A1 | 6/2006 | Jagadeesan et al. |
| 2006/0133582 A1 | 6/2006 | McCulloch |
| 2006/0187900 A1 | 8/2006 | Akbar |
| 2006/0198360 A1 | 9/2006 | Biage et al. |
| 2006/0245413 A1 | 11/2006 | Skalecki et al. |
| 2007/0070948 A1 | 3/2007 | Kezys et al. |
| 2007/0081518 A1 | 4/2007 | Jain et al. |
| 2007/0083918 A1 | 4/2007 | Pearce |
| 2007/0086584 A1 | 4/2007 | Rossini |
| 2007/0197224 A1 | 8/2007 | Winkler |
| 2007/0206568 A1 | 9/2007 | Silver |
| 2007/0206571 A1 | 9/2007 | Silver |
| 2007/0217366 A1 | 9/2007 | Sagi et al. |
| 2007/0263613 A1 | 11/2007 | Hara et al. |
| 2008/0026732 A1 | 1/2008 | Goldfarb |
| 2008/0032695 A1 | 2/2008 | Zhu et al. |
| 2008/0056235 A1 | 3/2008 | Albina et al. |
| 2008/0096560 A1 | 4/2008 | Felske et al. |
| 2008/0102815 A1 | 5/2008 | Sengupta et al. |
| 2008/0113683 A1 | 5/2008 | Paas |
| 2008/0123625 A1 | 5/2008 | Buckley |
| 2008/0192900 A1 | 8/2008 | Liu |
| 2008/0232352 A1 | 9/2008 | Terrill et al. |
| 2008/0242299 A1 | 10/2008 | Edwards |
| 2008/0254797 A1 | 10/2008 | Achtari et al. |
| 2008/0261603 A1 | 10/2008 | Sever |
| 2008/0279176 A1 | 11/2008 | Cheng |
| 2009/0003316 A1 | 1/2009 | Lee |
| 2009/0086937 A1 | 4/2009 | Horn et al. |
| 2009/0097450 A1 | 4/2009 | Wallis et al. |
| 2009/0141682 A1 | 6/2009 | Zou et al. |
| 2009/0191876 A1 | 7/2009 | Jain et al. |
| 2009/0233602 A1 | 9/2009 | Hughes |
| 2009/0249247 A1 | 10/2009 | Tseng |
| 2009/0285175 A1 | 11/2009 | Nix |
| 2009/0305732 A1 | 12/2009 | Marcellino |
| 2010/0080128 A1 | 4/2010 | Hovey et al. |
| 2010/0124897 A1 | 5/2010 | Edge |
| 2010/0172323 A1 | 7/2010 | Rexhepi et al. |
| 2010/0172483 A1 | 7/2010 | Weiner |
| 2010/0226339 A1 | 9/2010 | Stephenson et al. |
| 2010/0246785 A1 | 9/2010 | Wang |
| 2010/0285785 A1 | 11/2010 | Wang |
| 2010/0304724 A1 | 12/2010 | Lawler |
| 2010/0316199 A1 | 12/2010 | Martin, II |
| 2011/0044293 A1 | 2/2011 | Nagasawa |
| 2011/0103576 A1 | 5/2011 | Partington et al. |
| 2012/0014273 A1 | 1/2012 | Notton et al. |
| 2012/0115490 A1 | 5/2012 | Nicholson |
| 2012/0120914 A1 | 5/2012 | Sedlacek et al. |
| 2012/0140743 A1 | 6/2012 | Pelletier |
| 2012/0196644 A1 | 8/2012 | Scherzer et al. |
| 2012/0236868 A1 | 9/2012 | Yan |
| 2012/0282942 A1 | 11/2012 | Uusitalo |
| 2012/0296963 A1 | 11/2012 | Lu |
| 2013/0007286 A1 | 1/2013 | Mehta et al. |
| 2013/0035138 A1 | 2/2013 | Abbott |
| 2013/0064106 A1 | 3/2013 | Sylvain |
| 2013/0067056 A1 | 3/2013 | Purkayastha et al. |
| 2013/0100887 A1 | 4/2013 | Kim |
| 2013/0196653 A1 | 8/2013 | Morrison |
| 2013/0196706 A1 | 8/2013 | Patel et al. |
| 2013/0331101 A1 | 12/2013 | Thomas et al. |
| 2014/0068314 A1 | 3/2014 | Kim |
| 2014/0070991 A1* | 3/2014 | Liu .................. G01S 19/22 342/357.63 |
| 2014/0254491 A1 | 9/2014 | Lindholm |
| 2014/0269495 A1 | 9/2014 | Frantz |
| 2015/0038156 A1 | 2/2015 | Kilpatrick, II |
| 2015/0065134 A1 | 3/2015 | Vandemoere et al. |

FOREIGN PATENT DOCUMENTS

| | | |
|---|---|---|
| EP | 1519526 A1 | 3/2005 |
| EP | 1858270 A1 | 11/2007 |
| EP | 2009887 A1 | 12/2008 |
| EP | 2096843 A2 | 9/2009 |
| EP | 2112849 A2 | 10/2009 |
| EP | 2271171 A1 | 1/2011 |
| JP | 2002-262336 A | 9/2002 |
| WO | 0013454 A1 | 3/2000 |
| WO | 02/11475 A1 | 2/2002 |
| WO | 2004/057845 A1 | 7/2004 |
| WO | 2005055626 A1 | 6/2005 |
| WO | 2005101785 A1 | 10/2005 |
| WO | 2008110664 A1 | 9/2008 |
| WO | 2009040645 A1 | 4/2009 |
| WO | 2013025698 A1 | 2/2013 |

OTHER PUBLICATIONS

Perenson, Melissa, "Republic Wireless: Everything You Need to Know", Published on: Aug. 28, 2013, Available at: http://blog.laptopmag.com/republic-wireless-faq (6 pages total).

"ip4calls-iTelHybridDialer", Published on: Jul. 17, 2013, Available at: https://play.google.com/store/apps/details?id=com.revesoft.hybriddialer.first_united_international_general_trading_.ip4calls&hl=en (2 pages total).

Whitwam, Ryan, "A Google Engineer Explains Why KitKat has White Status Bar Icons and Only Shows Connectivity in Quick Settings", Published on: Nov. 18, 2013, Available at: http://www.androidpolice.com/2013/11/18/a-google-engineer-explains-why-kitkat-has-white-status-bar-icons-and-only-shows-connectivity-in-quick-settings/ (9 pages total).

Ormond, et al., "Dynamic Network Selection in Wireless LAN/MAN Heterogeneous Networks", In Proceedings of Mobile WiMAX: Towards Broadband Wireless Metropolitan Area Networks, Dec. 10, 2007, (60 pages total).

Alkhwlani, et al., "Access Network Selection using Combined Fuzzy Control and MCDM in Heterogeneous Networks", In Pro-

(56) References Cited

OTHER PUBLICATIONS ceedings of International Conference on Computer Engineering & Systems, Nov. 27, 2007, (6 pages total).
Porjazoski, et al., "Radio Access Technology Selection in Heterogeneous Wireless Networks Based on Service Type and User Mobility", in Proceedings of 18th International Conference on Systems, Signals and Image Processing, Jun. 16, 2011, (4 pages total).
Adamopoulou, et al., "Intelligent Access Network Selection in Heterogeneous Networks", In 2nd International Symposium on Wireless Communication Systems, Sep. 7, 2005, (5 pages total).
Alkhawlani, et al., "Hybrid Approach for Radio Network Selection in Heterogeneous Wireless Networks", In International Journal of Advanced Science and Technology, vol. 44, Jul. 2012, (16 pages total).
Cai, et al., "Dynamic and User-Centric Network Selection in Heterogeneous Networks", In Proceedings of IEEE International Performance, Computing, and Communications Conference, Apr. 11, 2007, (7 pages total).
Gharsellaoui, et al., "Optimizing Access Point Selection in Wireless Local Area Networks", In Proceedings of International Conference on Communications and Information Technology, Mar. 29, 2011, (6 pages total).
Nelson, et al., "Hybrid Telecommunications Network Connection Indicator", U.S. Appl. No. 14/220,071, filed Mar. 19, 2014.
Santos, et al., "Deployment of a Wireless Hybrid and Mobile Network for VoIP Services Based on Open Source Software," Universidade Federal de Campina Grande, Retrieved From: http://www.inf.int-evry.fr/~olberger/wfs2006/danilo, Retrieved Date: Sep. 16, 2013 (20 pages total).
Rauhala, J., "Universal SIP client for consumer devices," Helsinki University of Technology, Department of Electrical Communications Engineering, Thesis submitted May 13, 2003, Retrieved from: http://scholar.google.com/url? sa=U&q=http://antoine.fressancourt.free.fr/exjobb/BX_Universal, Retrieved Date: Sep. 16, 2013 (64 pages total).
Bryan, et al., "SOSIMPLE: A SIP/SIMPLE Based P2P VoIP and IM System," Computer Science Department, College a of William and Mary, Williamsburg, VA, Retrieved from: http://www.enseirb.fr/~kadionik/sip/paper, Retrieved Date: Sep. 16, 2013 (6 pages total).
H. Schulzrinne, et al., "RTP: A Transport Protocol for Real-Time Applications", The Internet Society (Jul. 2003), Retrieved from: http://www.rfc-editor.org/rfc/rfc3550.txt, Retrieved on: Sep. 12, 2013 (98 pages total).
J. Rosenberg, et al., "SIP: Session Initiation Protocol", The Internet Society (Jun. 2002), Retrieved from: http://www.rfc-editor.org/rfc/rfc3261.txt, Retrieved on: Sep. 12, 2013 (252 pages total).
Kalmanek, et al., "A Network-Based Architecture for Seamless Mobility Services", In IEEE Communications Magazine, vol. 44, Issue 6, Jun. 2006 (7 pages total).
Salkintzis, et al., "Voice Call Handover Mechanisms in Next-Generation 3GPP Systems", In IEEE Communications Magazine, vol. 47, Issue 2, pp. 46-56, Feb. 2009 (11 pages total).
Voice Call Flow Overview, 2007 Cisco Systems, Inc., pp. 1-14, Retrieved from: http://www.cisco.com/en/US/docs/ios/voice/monitor/configuration/guide/vt_callflow_ov.pdf, Retrieved on: Jun. 17, 2013 (14 pages total).
J. Rosenberg, "Interactive Connectivity Establishment (ICE): A Protocol for Network Address Translator (NAT) Traversal for Offer/Answer Protocols", IETF Trust (Apr. 2010), Retrieved from: http://www.rfc-editor.org/rfc/rfc5245.txt, Retrieved on: Sep. 12, 2013 (110 pages total).
M. Baugher, et al., "The Secure Real-time Transport Protocol (SRTP)", The Internet Society (Mar. 2004), Retrieved from: http://www.rfc-editor.org/rfc/rfc3711.txt, Retrieved on: Sep. 12, 2013 (53 pages total).

"International Search Report and Written Opinion Received for PCT Patent Application No. PCT/US2014/068685", Mailed Date: Feb. 11, 2015, 7 Pages.
"Route to Home", Published on: Mar. 10, 2012, Available at: http://www.inovar.com/products/RouteToHome.html (1 page total).
"Smart Call Routing", Retrieved on: Dec. 31, 2013, Available at: http://www.roamware.com/downloads/datasheets/Smart%20Call%20Routing.pdf (2 pages total).
"Roaming Call Optimizer", Published on: Mar. 22, 2011, Available at: http://www.starhome.com/call-optimization.html (1 page total).
"Optimal Call Routing", Retrieved on: Dec. 31, 2013, Available at: http://www.bics.com/content/ocr (2 pages total).
"Mobile Collaboration", Retrieved on: Dec. 31, 2013, Available at: http://www.cisco.com/en/US/docs/voice_ip_comm/cucm/srnd/collab09/mobilapp.htmln (39 pages total).
Calhan, et al., "An Adaptive Neuro-Fuzzy Based Vertical Handoff Decision Algorithm for Wireless Heterogeneous Networks", In IEEE 21st International Symposium Personal Indoor and Mobile Radio Communications, Sep. 26, 2010, 6 pages.
Yan, et al., "A Survey of Vertical Handover Decision Algorithms in Fourth Generation Heterogeneous Wireless Networks", In Computer Networks: The International Journal of Computer and Telecommunications Networking, vol. 54, Issue 11, Aug. 2010, 16 pages.
Liu, et al., "Performance Analysis and Optimization of Handoff Algorithms in Heterogeneous Wireless Networks", In IEEE Transactions on Mobile Computing, vol. 7, Issue 7, Jul. 2008, 12 pages.
Wong, et al., "A Pattern Recognition System for Handoff Algorithms", In IEEE Journal on Selected Areas in Communications, vol. 18, Issue 7, Jul. 2000, 12 pages.
Sidhu, et al., "Call Continuity", unfiled US Patent Application.
Bellavista, et al., "An IMS Vertical Handoff Solution to Dynamically Adapt Mobile Mulitmedia Services", IEEE Symposium on Computers and Communications, Jul. 6, 2008, pp. 764-771, 8 pages.
Achour et al., "Inter-Domain Mobility Management Solution for Service Continuity in IMS-Based Networks", IEEE Consumer Communications and Networking Conference, Jan. 14, 2012, pp. 559-564, 6 pages.
"International Search Report and Written Opinion Issued in PCT Application No. PCT/US2015/028679", Mailed Date: Aug. 26, 2015, (11 Pages total).
"International Preliminary Report on Patentability Issued in PCT Application No. PCT/US2014/054633", Mailed Date: Aug. 21, 2015, 6 Pages total.
"International Search Report and Written Opinion Issued in PCT Patent Application No. PCT/US2015/020848", Mailed Date: Jun. 9, 2015, (11 Pages total).
"International Search Report & Written Opinion Received for PCT Application No. PCT/US2015/023453", Mailed Date: Jun. 22, 2015, (12 Pages total).
"International Search Report and Written Opinion Issued in PCT Application No. PCT/US2015/39310", Mailed Date: Oct. 14, 2015, (10 Pages total).
"International Preliminary Report on Patentability Issued in PCT Application No. PCT/US2014/068685", Mailed Date: Jun. 26, 2015, (6 Pages total).
"International Preliminary Report on Patentability Issued in PCT Application No. PCT/US2015/020848", Mailed Date : Jun. 28, 2016, (13 Pages total).
Ryan Whitman, "A Google Engineer Explains Why KitKat Has White Status Bar Icons and Only Shows Connectivity in Quick Settings", available at <http://www.androidpolice.com/2013/11 /1 8/a-goog le-eng ineer-explains-why-kitkat-has-wh ite-status-baricons-and-only-shows-connectivity-in-quick-settings/>, availabe on Nov. 18, 2013, (3 pages total).
"International Search Report and Written Opinion Issued in PCT Application No. PCT/US2015/056290", Mailed Date: Feb. 1, 2016, (15 Pages total).
"Second Written Opinion Issued in PCT Application No. PCT/US2015/023453", Mailed Date: Mar. 1, 2016, 6 Pages.
"Second Written Opinion Issued in PCT Application No. PCT/US2015/020848", Mailed Date : Mar. 30, 2016, (7 Pages total).

(56) References Cited

OTHER PUBLICATIONS

Corey Gunther, "What's this icon? Galaxy S4 notification bar icons explained", available on Jul. 9, 2013, available at <http://androidcommunity.com/whats-this-icon-galaxy-s4-notification-bar-icons-explained-20130709/>, (3 pages total).

designyourway.com, "User Interface Design Inspiration—45 Lovely Switches", avaible at <http://www.designyourway.net/drb/user-interface-desig n-inspiration-45-lovely-switches>, archived on 0712012013 at wayback machine <http://web.archive.org>, (16 pages total).

International Preliminary Report on Patentability issued in PCT Application No. PCT/US2015/023453, mailed date: Jun. 17, 2016 (10 pages total).

"International Preliminary Report on Patentability Issued in PCT Application No. PCT/US2015/39310", Mailed Date: Jun. 2, 2016, (6 Pages total).

"International Preliminary Report on Patentability Issued in PCT Application No. PCT/US2015/020848", Mailed Date: Jun. 28, 2016, 8 pages.

US Final Office Action issued Sep. 6, 2016 in related U.S. Appl. No. 14/519,474 (35 pages total).

\* cited by examiner

CALL HANDOFF INITIATION IN HYBRID NETWORKS

BACKGROUND

Users of mobile devices such as mobile and smartphones generally move around in multiple ways—walking, running, driving, and so on—and typically expect that any call they have in progress should continue uninterrupted. Also they desire use of the least expensive connection to network infrastructure in order to save on costs while still expecting reasonable call quality to be maintained. Hybrid networks that employ a combination of connection technologies—for example, Wi-Fi, cellular voice and cellular data, and conventional wireline—may implement some form of voice call continuity ("VCC") capability in order to meet these expectations and desires. Such capabilities may involve mechanisms for handing off an ongoing call from one type of connection to another type with as imperceptible an interruption as possible. Handoff is a multi-step process with a fundamental step being to decide that a call handoff to a new connection is needed and which new connection to use. Cellular radio networks already provide mechanisms for automatically moving the mobile device's call from one cell tower to a neighboring one as the user moves from one location to another. However, the process for hybrid networks is more involved and needs new solutions.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A continual learning process is applied to a class of risk estimate-based algorithms and associated risk thresholds used for deciding when to initiate a handoff between different types of network connections (e.g., Wi-Fi, cellular voice and data, and wireline) that are available to a mobile device having telephony functionality such as a cell phone or smartphone. The continual learning process is implemented as a virtuous loop providing ongoing tuning and adjustment to improve call handoff algorithms and risk thresholds so that handoffs can be performed with the goals of minimizing dropped calls and unacceptable degradation in call quality as well as avoiding premature handoffs. Crowd-sourced data comprising outcomes for past attempts at handoffs for calls and parameters associated with each handoff outcome (where the parameters include at least one of environmental context of a mobile device in which a handoff was attempted or measured characteristics of network connections available to the mobile device prior to the attempted handoff) are collected and used to reduce the likelihood of premature handoff and dropped calls.

Device characteristics, environmental context, connection measurements, and outcomes of call handoff decisions are crowd-sourced from a population of mobile devices into a cloud-based handoff enabling service. The cloud-based handoff enabling service evaluates potentially usable handoff decision algorithms and risk thresholds against archived crowd-sourced data to determine how they would have performed in real world situations. The cloud-based handoff enabling service can then deliver improved handoff decision algorithms and risk thresholds to the mobile devices, or to other network service elements making the handoff decision, that are more optimally applied to a given environmental context for a device (e.g., location, time of day/day of week, etc., when a handoff is attempted) which can result in better handoff outcomes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
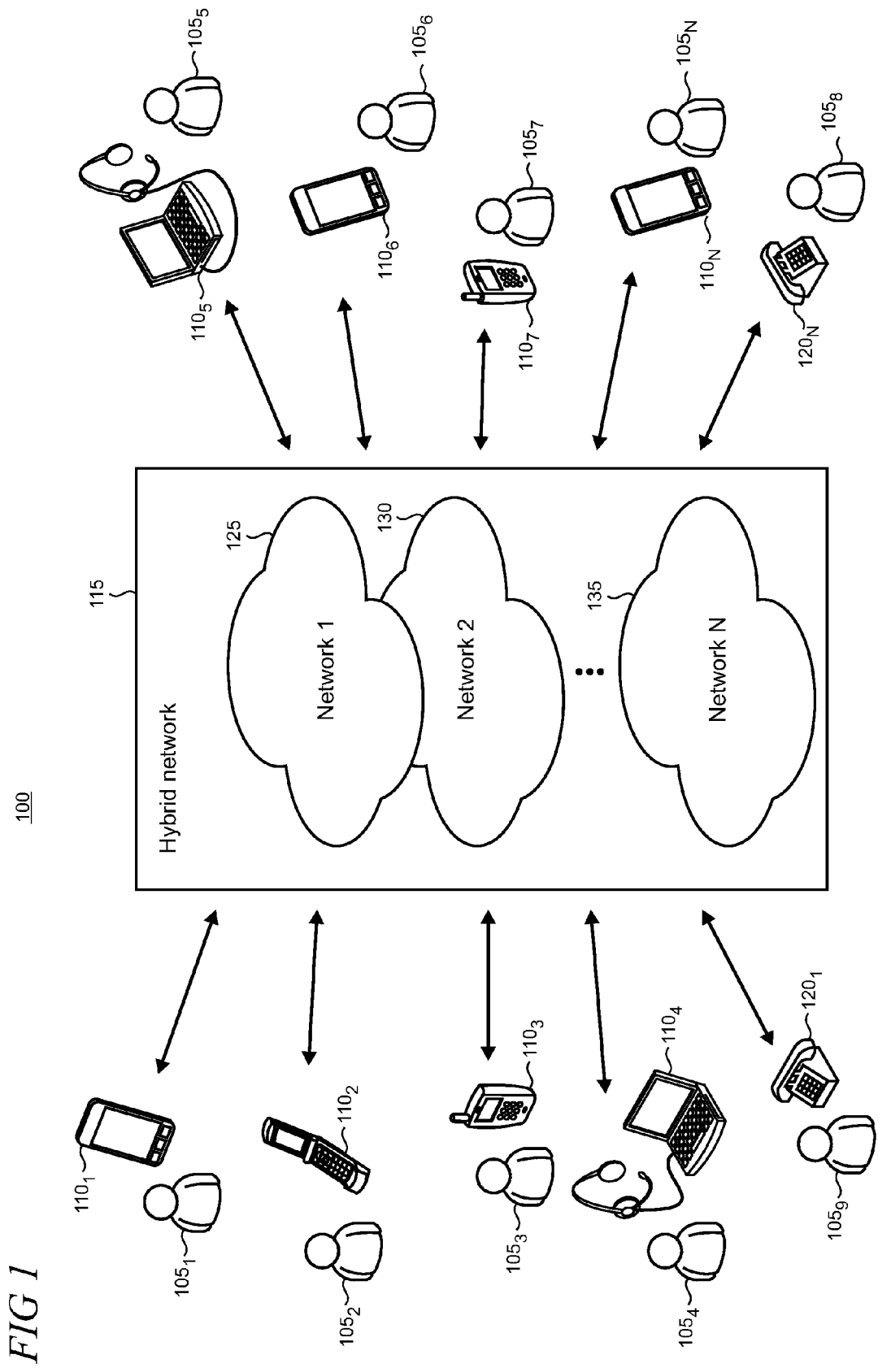
FIG. 1 shows an illustrative telecommunications environment in which devices having telephony capabilities communicate over a hybrid network.

Users of mobile devices including cell, mobile and smartphones have come to expect that their ongoing calls will proceed without interruption as they move around. Cellular networks provide automated mechanisms for handoff of calls from one cell to another without noticeable interruption of the call. For hybrid networks that employ a combination of connection technologies, for example Wi-Fi (under IEEE 802.11), cellular voice, and cellular data, the call cannot be achieved by simply using these existing systems and methods, particularly when control of parts of the hybrid network are restricted from controlling other parts.

Achieving an effective call handoff in a hybrid network can involve two fundamental steps: the first step is deciding that a handoff of an ongoing call is needed from an instance of one type of connection to an instance of another type of connection, and the second step is the actual process of performing the call handoff itself. The first problem is inherently difficult due to a number of factors. For example, a call handoff can often take a significant amount of time to achieve, typically on the order of several seconds. Therefore it becomes desirable that the call handoff decision be made in an anticipatory or predictive fashion in order to avoid call disconnection or unacceptable degradation in call quality. There is no currently-known, well-established, and reliable way of predicting from radio signals and environmental context information that a call will need to be handed off to another connection incorporating such anticipatory fashion. Moreover, there are very limited empirical methodologies available and no single observed variable appears to serve as a definitive predictor. Unfortunately, failure to predict the need for a handoff with adequate anticipation can lead to dropped calls and/or lengthy call disruptions. On the other hand, performing call handoff too early can lead to incurrence of higher costs on more expensive cellular network connections or thrashing between different network connections in some cases.

Typically, a call handoff decision is made as a result of determining that some factors related to the current connection and the mobile device's environmental context are deteriorating and the risk of the call being disconnected or degraded unacceptably is becoming high. Alternatively, a decision to hand off a call decision may be made when a less expensive connection having appropriate quality characteristics has become available.

One particularly significant handoff case is the transition of a call from a Wi-Fi connection to a cellular voice connection. The handoff can take several seconds due to the need for association and interaction with the cellular network in order to establish a new call path. In addition, the range of Wi-Fi coverage is relatively small (typically on the order of 100 to 300 meters) and the loss of adequate Wi-Fi connectivity can be relatively abrupt depending on the movement characteristics of the user, surrounding physical structures and people, and the mobile device's location relative to the Wi-Fi access point. Thus, the risk of a call over a Wi-Fi network being disconnected as the user moves around in a Wi-Fi coverage area is higher in comparison to typical intra-cellular system handoffs.

Additional factors that can influence the call quality and thus indicate the need for handoff include data congestion on the mobile device's current Wi-Fi connection. Data congestion can be the result of various environmental and circumstantial factors. For example, Wi-Fi connections in settings such as a typical home are used by many competing applications, some of which are very data intensive such as video streaming. A shared Wi-Fi network can be adversely impacted by such competing uses. The usage can display temporal patterns such as heavier use when family members are at home, for example, in the evening after work and school or on weekends. Wi-Fi congestion in workplaces and public places can show different temporal and event-related patterns. All of these factors can make the call quality deteriorate and indicate a need to hand off the call to a cellular connection. At the same time, if the congestion impact is short, such as a fraction of a second, then it may be considered as just a transient state and it could be better to stay on the Wi-Fi connection and avoid the higher cost of a cellular connection. Users at various public venues and events such as sports events where they are using Wi-Fi network connections can also experience high congestion while such events are in progress with the accompanying risk that their Wi-Fi network-based calls will be impacted adversely. In some cases, even if a Wi-Fi access point itself is fine, its connection to a backend network such as the Internet may be of limited bandwidth, be of poor quality, or be in a congested state.

Turning now to the drawings, FIG. 1 shows an illustrative telecommunications environment 100 in which various users 105 employ respective devices 110 that communicate over a hybrid telecommunications network 115. The devices 110 provide voice telephony capabilities, typically in addition to various other features. The devices 110 may include, for example, user equipment, mobile phones, cell phones, and smartphones which users often employ to make and receive voice and/or multimedia calls. However, alternative types of electronic devices are also envisioned to be usable within the telecommunications environment 100 so long as they are configured with telephony capabilities and can connect to the hybrid network 115, as described in more detail below. Such alternative devices variously include handheld computing devices, PDAs (Personal Digital Assistants), portable media players, wearable computers, navigation devices such as GPS (Global Positioning System) systems, laptop PCs (personal computers) desktop computers, multimedia consoles, gaming systems, or the like. In the discussion that follows, the use of the term "mobile device" is intended to cover all devices that are configured with telephony capabilities and are capable of wireless connectivity to the hybrid network 115.

Other types of telephony equipment may also be present in the telecommunications environment 100 such as conventional desktop phones 120 which are operatively coupled to a public switched telephone network ("PSTN"). Other examples may include equipment that connects to the PSTN using private branch exchanges ("PBXs") and equipment coupled to call services that are accessed using telephone numbers. This other telephony equipment may still be utilized in various scenarios involving voice call continuity, even though it might not implement voice call continuity functionality itself. For example, a mobile phone 110 may make or receive a call to/from a desktop phone 120 and employ voice call continuity as the prevailing connection conditions change such as the mobile device user moving from a car to home during the call.

The hybrid network 115 comprises several networks 1, 2 . . . N, identified in FIG. 1 by reference numerals 125, 130, and 135, respectively. Typically, the various networks will be accessed using different types of wireless connections including, for example, Wi-Fi, cellular packet-switched data, or cellular circuit-switched voice connections. Thus, the networks in the hybrid network 115 typically include a Voice over Internet Protocol ("VoIP") network and a mobile operator ("MO") network which typically includes an access network portion and a core network portion that provides for switching, routing, transport and other functionalities. A PSTN wireline network may also be included as part of the hybrid network in some implementations, as discussed in more detail below.

Each mobile device 110 will typically have a prearranged association with one or more of the networks underlying the hybrid network 115. For example, a user 105 will typically be a subscriber to a cellular telephone service so that the user's mobile device 110 can access a given cellular network as valid and authenticated user equipment. Similarly, the mobile device 110 may include functionality and/or credentials as may be needed to access a Wi-Fi network. The mobile devices 110 may also be provided with voice call continuity functionality and interoperate with a core VoIP network (shown below in FIG. 3) according to a prearranged association. Such mobile devices are considered "VCC-equipped" and can make calls over different types of connections including Wi-Fi, cellular voice, and cellular data connections. In some situations, a mobile device may be placed in a dock or cradle that is coupled to the PSTN and thus could employ a wireline connection for a call which is often the least expensive network connection. Typically, the mobile devices 110 use the less expensive Wi-Fi connection whenever it is available and capable of providing a reasonable level of call quality. When Wi-Fi is not available or is inadequate for the voice call, the call may be made over one of the other available network connection options after determining that the selected connection will result in acceptable call quality. Cellular voice is the costliest connection alternative but also the most ubiquitous and so it is used to ensure that the user has access to calling services from as wide an area as possible. In the description that follows, the mobile devices 110 are considered to be VCC equipped unless otherwise indicated.

Figure 2:
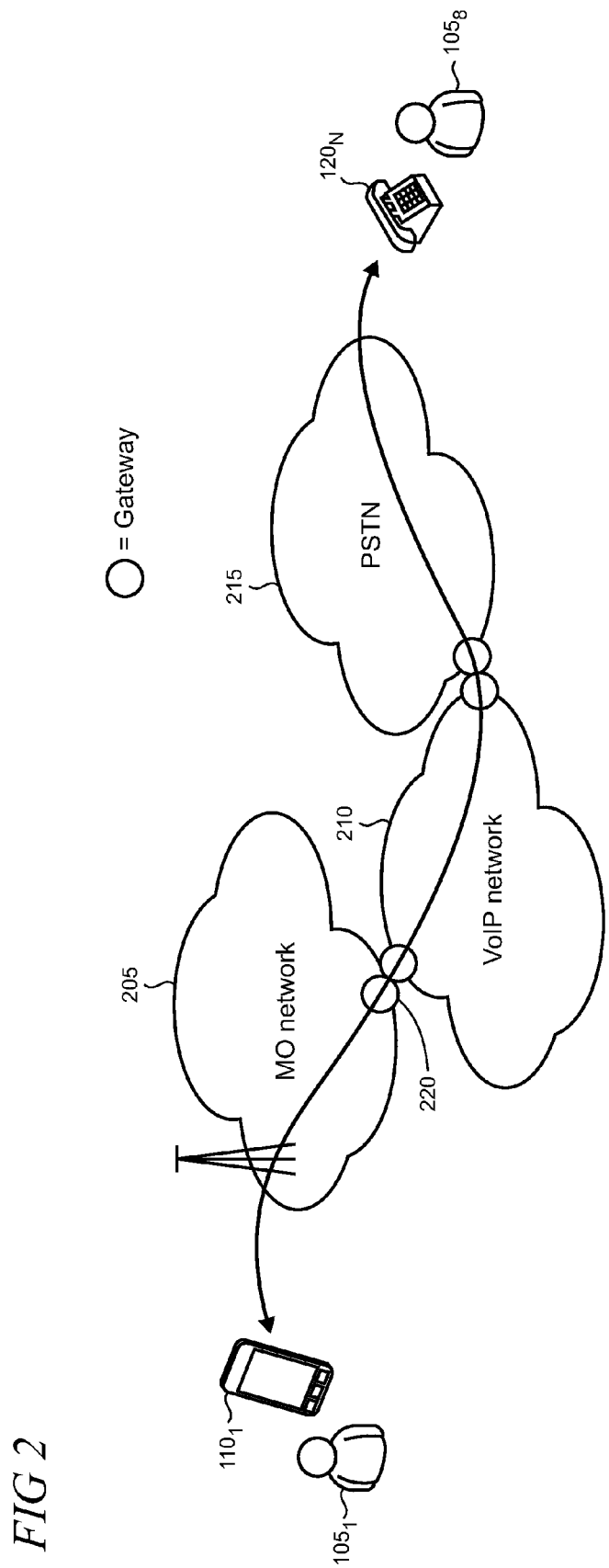
FIG. 2 shows an illustrative example in which a call is carried over multiple types of telecommunications networks.

A characteristic of the hybrid network 115 is that two or more of the underlying networks (e.g., networks 125, 130, 135) are considered loosely coupled. That is, in one illustrative example, the VoIP network and the MO network are typically operated independently so that one network cannot exercise significant or substantial control over the operation of the other. However, as shown in FIG. 2, the underlying networks, while loosely coupled, are still interoperable so that calls can traverse an MO network 205, VoIP network 210, and PSTN 215. Such interoperability is commonly facilitated using gateways, as representatively indicated by reference numeral 220. It is becoming increasingly common for significant portions of a given call to be transported over the VoIP network 210 because such networks can often provide very high quality transportation at the lowest cost to the network operators. In such cases, the MO network 205 and the PSTN network 215 essentially function as access networks to the mobile device at each end of the call while the VoIP network 210 performs the bulk of the routing and transport for the call. Other access networks may also be utilized in order for a call to reach the VoIP network 210 including both cellular circuit-switched and packet-switched networks, and Wi-Fi access points such as public Wi-Fi "hotspots" and those provided by home and office Internet Service Providers ("ISPs").

While such hybridization can provide cost-effective and high quality transport, the loose coupling has traditionally presented difficulties for voice call continuity. In this case, parts of the hybrid network 115, such as the cellular MO network, are not generally controllable by the mobile device or the rest of the hybrid network. As a result, previous solutions for voice call continuity typically involved some form of user intervention and have often resulted in some form of call interruption or other type of degraded user experience. Such intervention often necessitates that the user be aware that connection options are changing and therefore make a pro-active request that the ongoing call be handed over to a different available connection. For example, a user would traditionally need to proactively implement a handoff from a Wi-Fi to a cellular connection (e.g., cellular voice or cellular data), or vice versa, in order to ensure voice call continuity. Because these traditional solutions depend on the user to initiate the call handoff, there is often a high risk that the call could be dropped altogether if the initiation occurs at the wrong time.

The present arrangement may enable handoff to be initiated automatically and transparently to the user as conditions change in typical usage scenarios. A mobile device's environmental context is continually monitored so that uninterrupted calls may be provided over the lowest cost connection available. When the monitoring indicates that the conditions are such that the connection is likely to degrade unacceptably or be interrupted in the imminent future, or when a less expensive or more reliable connection is available (and/or a connection having a desirable feature such as High Definition audio is available), a handoff of the call to such a connection is initiated. Generally, a connection is selected that meets the two goals noted above in most cases—maintaining call continuity using the lowest cost connection.

In some cases, a given mobile device may be configured to expose a manual control to the user that can be utilized to switch over from a Wi-Fi to a cellular connection (for example when the user is planning to leave home to get in the car and go to work), or to keep the call on an existing connection even when another connection is available that could be better quality. An alert can be generated and provided to the user of pending call degradation instead of implementing an automatic handoff. For example, there may be scenarios in which the user desires to avoid the cost associated with a cellular call such as when the user is roaming or when the user's cellular airtime balance is running low. In such cases, the handoff can be configured to be performed only with explicit user input to the manual control.

Figure 3:
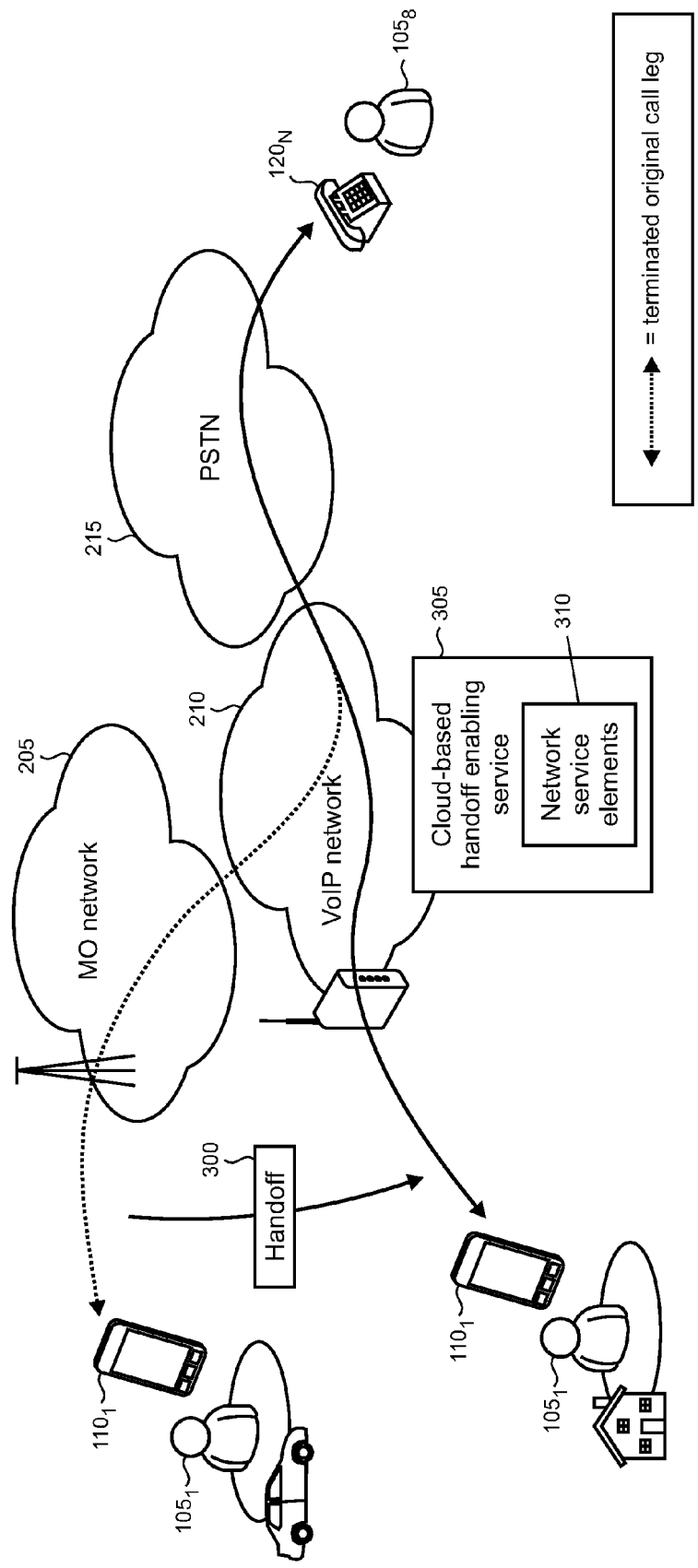
FIG. 3 shows an illustrative example in which a call is handed off between two different networks.

An illustrative handoff scenario is shown in FIG. 3 in which a user 105 may be in the car when initiating a call over the MO network 205. When the user 105 returns home, another call leg is then created over a selected connection which in this example is the home Wi-Fi connection to the VoIP network 210. The selected connection is associated with the call, preferably while the original call is still ongoing (in what is termed a "make-before-break" handoff). When the new call leg is stable, the original call leg is removed from the call and the handoff 300 to the new connection is complete.

If the handoff is initiated so that both the original and newly selected connections are operative simultaneously then there will be an intermediate state in which both call legs will be running in parallel. Media flows can be directed to and from the mobile device over these parallel connections, until one of the two flows is terminated. Such intermediate state enables the call to be maintained in an uninterrupted manner as perceived by the parties on both ends of the call. During the intermediate state, the mobile device can typically choose to connect to one of the two flows as it deems appropriate.

As shown in FIG. 3, a cloud-based handoff enabling service 305 is incorporated into the VoIP network 210. The cloud-based handoff enabling service 305 implements various network service elements 310 that work in conjunction with mobile devices to deliver the learning and enabling capabilities of the algorithms and risk thresholds used for call handoff initiation to the mobile device, as described in more detail below. As shown below in FIG. 5, the actual call handoff decision mechanism can be implemented either in the cloud in a specific call handoff initiation service, or in combination with elements on the mobile device. In alternative arrangements, the cloud-based handoff enabling service 305 can be implemented either partially or completely separate from the VoIP network 210.

Figure 4:
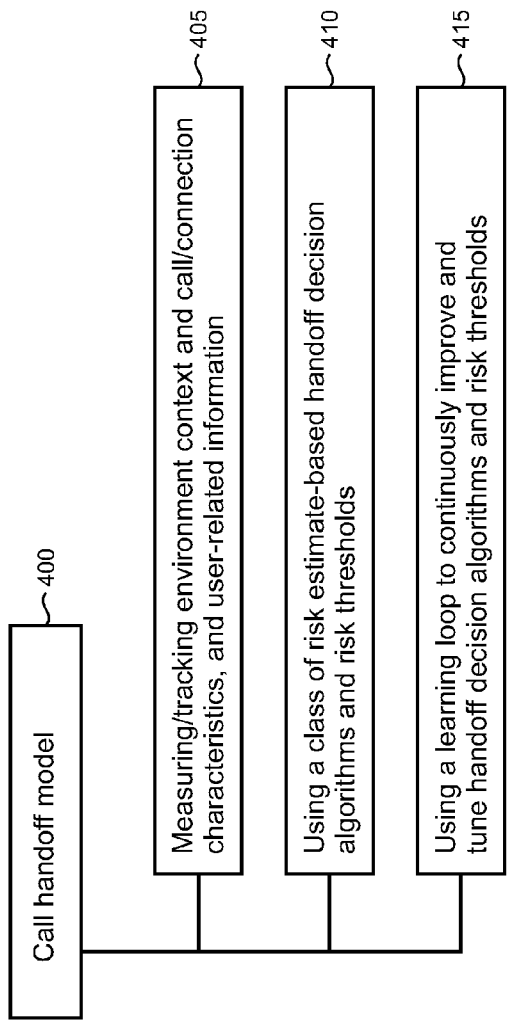
FIG. 4 shows an illustrative taxonomy of a call handoff model.

FIG. 4 shows a three part call handoff model 400. The model 400 includes measuring and tracking device characteristics, environmental context, call/connection characteristics, and user-related information (as indicated by reference numeral 405); using a class of risk estimate-based handoff decision algorithms for call risk assessment and risk thresholds for triggering handoffs (410); and continuously improving and tuning the handoff decision algorithms and risk thresholds using a virtuous learning loop (415). It is noted that these algorithms and risk thresholds may be applied to a specific instance of a connection type (e.g. a specific Wi-Fi access point at a specific location).

During an ongoing call, the mobile device 110 typically continuously measures and tracks a variety of environment and call/connection characteristics. Using this measurement data, one of a class of risk estimate-based handoff decision algorithms is then employed that continually evaluates the risk of the call being dropped or unacceptably degraded in the near future. This class of risk estimate-based handoff decision algorithms estimates the contribution to the risk of a variety of environmental context factors and applies one or more respective risk thresholds. When a handoff decision algorithm being run determines that one or more risks have exceeded a risk threshold of acceptability for an ongoing call, then a decision is made to hand off the call to a better connection having lower risk.

Figure 5:
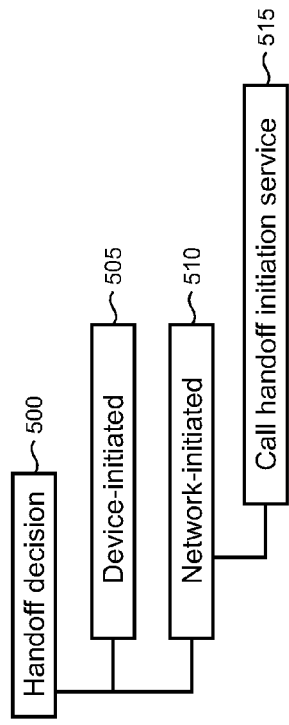
FIG. 5 shows an illustrative taxonomy of two handoff types.

As shown in FIG. 5, a given handoff decision 500 is typically initiated by the mobile device 110 as indicated by reference numeral 505, however in some cases the handoff may be initiated in a network (e.g., the VoIP network), as indicated by reference numeral 510 by utilizing a specific cloud-based call handoff initiation service 515. For example, handoff decision algorithms may be run in the cloud-based handoff initiation service 515 leveraging, for example, the network service elements 310 (FIG. 3), so that the handoff decision may be communicated to the mobile device 110. In such a service-initiated decision case, the measurements can be provided to the network service elements 310 from the mobile device. Alternatively, techniques may be employed in which the handoff decision is implemented using a combination of network and device decision making or initiation. Primarily for reasons of unpredictable latency in call setup over a cellular network, there may be advantages to the handoff decision being device-initiated in many implementations.

The success of the handoff decision algorithms can continually be improved and more appropriate algorithms used for a particular environmental context by using a virtuous learning loop that is implemented between mobile devices and a cloud-based service. Historical/temporal factors may also be utilized with the virtuous learning loop. For example, a family at home may make heavier use of its Wi-Fi network to stream media content between the after work/school hours of 6 pm and 11 pm on weekdays. During these heavier use hours the risk of Wi-Fi based calls experiencing difficulties due to congestion will be higher. Similarly, congestion on the ISP service supporting the Wi-Fi connection is also likely to show such time-related adverse behavior. Use of the microwave oven will be higher during breakfast and dinner times again leading to higher risk of degradation of voice call quality on some Wi-Fi connections in that home at those times. In these instances the crowd-sourced information could be expected to indicate that calls over Wi-Fi during these hours in these locations experienced call behavior problems. The particular handoff decision algorithm and thresholds used by a mobile device in the home may then take into consideration the effects of such other environmental context factors for its own learning algorithms based on the crowd-sourced information.

Environmental context, call and connection measurements, and outcomes of handoff attempts may be crowd-sourced from a population of mobile devices as inputs into the cloud-based handoff enabling service 305 to identify time and place-related patterns to enable modification of the handoff decision algorithm and risk thresholds for different locations and different temporal slots to improve the handoff outcomes across the population.

Each of the components in the call handoff model 400 shown in FIG. 4 is discussed in more detail below.

Figure 6:
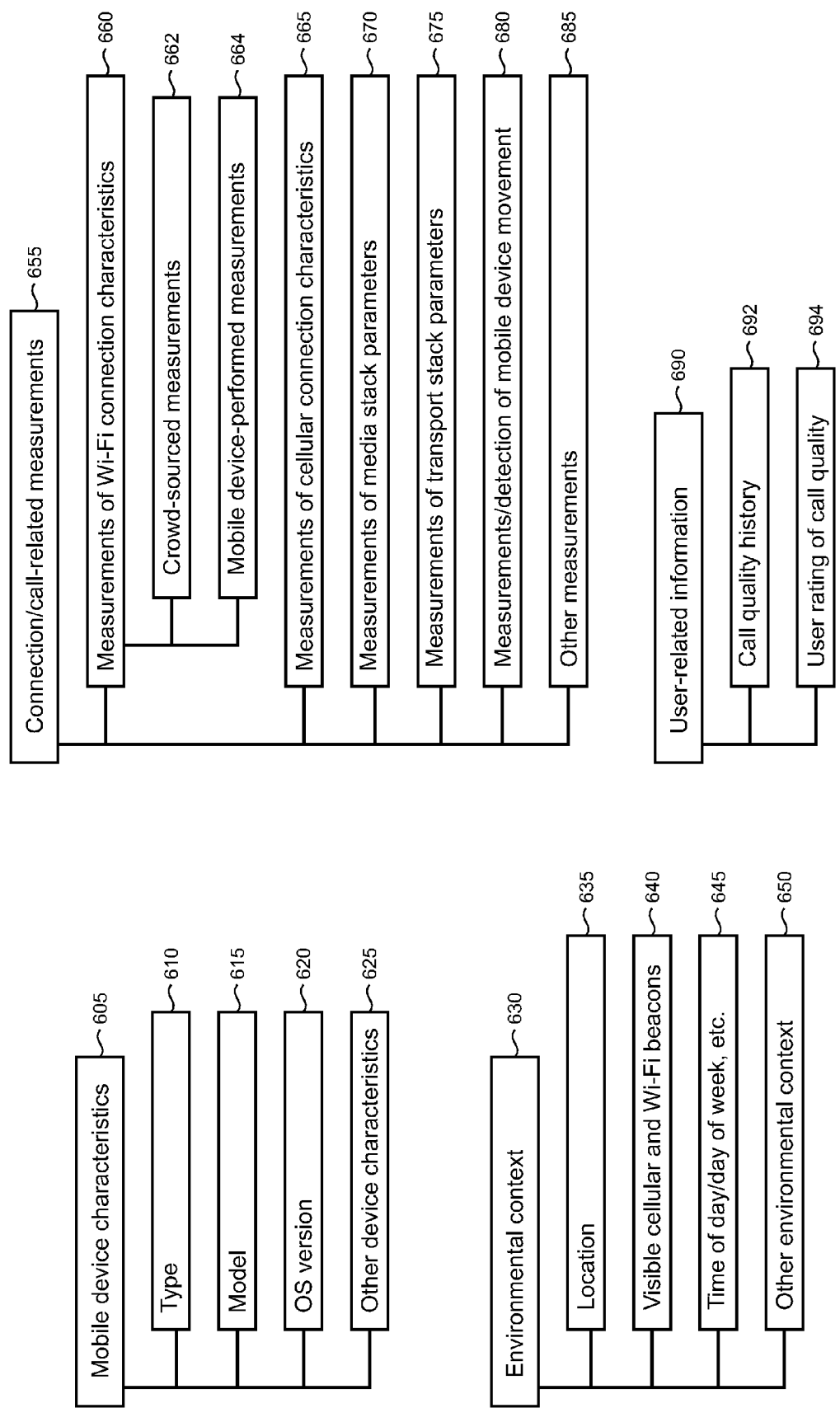
FIG. 6 shows illustrative taxonomies of mobile device characteristics, environmental context, connection/call-related measurements, and user-related information.

In the measuring and tracking portion 405 of the model 400, mobile device characteristics, environmental context, and user-related information may be captured and utilized. As shown in FIG. 6, the mobile device characteristics 605 may include, for example, device type 610, device model 615, the operating system ("OS") version 620 that is currently installed on the mobile device 110, and various other mobile device characteristics 625. The environmental context 630 may include, for example, the current location 635 of the mobile device 110 (e.g., specified using known places such as home or work, or using geographic coordinates such as latitude and longitude), identification of visible cellular and Wi-Fi radio beacons 640, the time of day/day of week, etc. 645 at which a current call is taking place, and various other environmental context parameters 650. The other environmental context may include, for example, the user's schedule, appointments, and other calendar information that may be utilized by the handoff enabling service with the user's consent in order to improve the call handoff experience for the user.

The connection and call-related measurements 655 may include, for example, measurements of Wi-Fi connection characteristics for the current call 660, measurements of cellular connection characteristics 665, measurements of media stack parameters 670, measurements of transport stack parameters 675, measurements/detection of mobile device movement or activity 680, and various other connection/call-related measurements 685. In the case of the measurements of Wi-Fi connection characteristics 660, there can be both crowd-sourced measurements 662 and mobile device-performed measurements 664. For example, the crowd-sourced measurements 662 typically include those that are made by population of mobile devices over time while the mobile device-performed measurements 664 include those made by a particular mobile device by itself.

User-related information 690 can include a record of the call handoff enabling service's assessment of a given user's call history 692. In addition, a user-provided rating of the quality of various calls can also be implemented and utilized in some cases. The user-related information 690 can be considered by the call handoff enabling service 305 when determining a level of risk that may be undertaken when the mobile device 110 performs a handoff. Typically, there is a balance that can be struck when performing handoffs that minimizes the potential for annoying the user. For example, if the service 305 observes on its own, and/or using feedback from the user ratings, that a given user has been experiencing frequent poor quality calls, then the service may want to provide call handoff decision algorithms and risk thresholds to that user's mobile device that tend to optimize connections for the highest call quality. In this case, the mobile device can reasonably be more aggressive in connecting to a high quality (albeit typically more expensive) connection or staying on the high quality connection even when a less expensive, but perhaps less performant connection is available. Conversely, if the call quality history 692 and/or user rating 694 indicate that a user has had a reasonably good call experience history, then the service 305 may provide call handoff decision algorithms and risk thresholds that optimize connection handoffs to achieve the lowest cost. In this case the quality of service of the lower cost connection is less guaranteed, however, an occasional bad call experience is not likely to annoy the user who otherwise has experienced a history of good call quality and/or has provided good ratings for call quality (or has provided only a few bad ratings).

Figure 7:
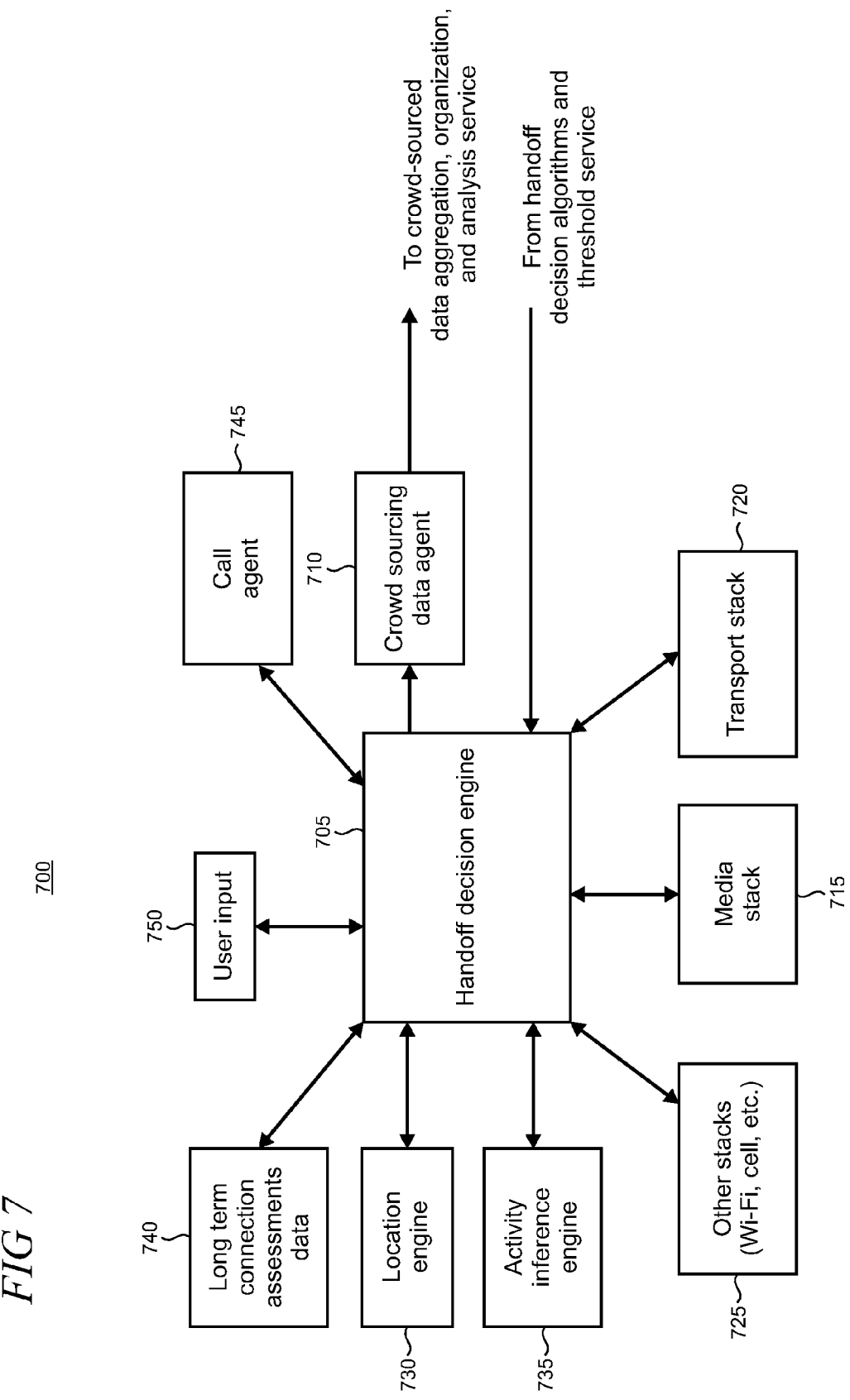
FIG. 7 shows an illustrative set of functional components that may be instantiated on a mobile device in order to facilitate the present call handoff initiation.

In this illustrative example, the connection and call-related measurements 655 are device-based. FIG. 7 shows an illustrative set of functional components 700 that may be instantiated on a mobile device in order to facilitate the present call handoff initiation. The components 700 are typically implemented in software, but may also be implemented in firmware, hardware, or various combinations or sub-combinations of software, firmware, and/or hardware.

As shown, a handoff decision engine 705 is arranged as a central hub with the other components in order to collect and send data through a crowd sourcing data agent 710 to the cloud-based handoff enabling service and receive handoff decision algorithms and risk thresholds from the service. In some implementations, historical connection measurement data may also be received from the cloud-based handoff enabling service. The handoff decision engine 705 interacts with a media stack 715 (e.g., a VoIP stack) and a transport stack 720 (e.g., an IP stack) to perform measurements of the current call quality, and may also interact with other stacks (collectively identified by reference numeral 725) such as a Wi-Fi stack and a cellular stack. A location engine 730 and activity inference engine 735 respectively provide data regarding the location of the mobile device and activity of the user (e.g., whether stationary or moving, rate of movement, etc.) to the handoff decision engine 705. Data relating to assessments of connection quality over time 740 is persisted on the mobile device and is available to the handoff decision engine 705. A call agent 745 provides an interface between the handoff decision engine 705 and other functional components (not shown) instantiated on the mobile device 110 so that handoff can be implemented once initiated by the engine based on its application of the three part model 400 (FIG. 4). In conjunction with the components shown in FIG. 7, the handoff decision engine 705 performs connection and call-related measurements as described in more detail below. A user input component 750 can function as a manual control that enables the handoff decision engine 705 to utilize user input in some cases. For example, as discussed above, the user may wish to manually switch connections, or stay on an existing connection in some cases even when a better quality connection is available to which a handoff would otherwise be performed. The user input component 750 can also function to enable the user to provide ratings about a given call, as discussed above.

Parameters for the device-based measurements of the Wi-Fi connection in use for a current call include the signal strength (i.e., the received signal strength), and the data rate for both the uplink and the downlink. The signal strength may be factored into a parameter known as the RSSI (Received Signal Strength Indicator) which represents the power in the received radio signal as seen by the mobile device. Although many factors can influence the value of RSSI, it will typically be smaller as the distance of the mobile device from the Wi-Fi access point increases. In a similar manner, obstructions between the Wi-Fi access point and the mobile device will reduce the observed RSSI. Accordingly, tracking the RSSI can provide directional indication as to whether the mobile device is moving towards the periphery of the Wi-Fi coverage area or into the stronger and more stable part of the area (i.e., respectively moving away from or closer to the Wi-Fi access point). Movement away from the Wi-Fi access point is expected to increase the risk that the call is disconnected.

It is noted that the RSSI values are determined from the received signal power and furthermore that the Wi-Fi access point can adjust the power that it transmits to improve the RSSI values. RSSI values may be tracked to generate trends which can also serve as a directional indication as to whether the mobile device is moving towards or away from the Wi-Fi access point. In this case, the more dynamic value trends of RSSI are utilized instead of RSSI values averaged over many seconds. A trend with a decreasing RSSI indicates movement towards the periphery of Wi-Fi coverage area, away from the access point, and thus suggests a higher risk of call degradation or disruption.

The dynamic link data rate (also often referred to as dynamic rate scaling) refers to a characteristic of Wi-Fi systems in which Wi-Fi compatible devices have their data communication rate scaled in pre-defined increments with permissible values defined by the IEEE (Institute of Electrical and Electronic Engineers) 802.11 standard. For instance, for the 802.11a and 802.11g classes, the defined rates are: 6, 9, 12, 18, 24, 36, 48, 54 Mbps, while for older 802.11b systems, the rates are: 1, 2, 5.5, 11 Mbps. Although the exact mechanisms by which a mobile device and a Wi-Fi access point determine the data link rates to use are not specified by the standards, one of the specified data link rates needs to be used. The rate is scaled up or down among the allowable rates based on a variety of factors including, for example, the distance of the device from the Wi-Fi access point, radio interference, physical obstructions in the radio path, the power of the mobile device's radio, etc. A higher link data rate can indicate that the mobile device is located in a more inner region of the coverage area of the particular wireless access point and hence likely to provide lower risk of call degradation, disruption, or drop. Thus, the dynamic link data rate, and/or its trend, is another parameter that can serve to indicate the level of risk of the ongoing call.

The uplink data rate is typically a good indicator of the quality of the uplink connection and may be used to determine when the mobile device is near the "radio edge" of the Wi-Fi space. It is noted that, in general, the physical bands in the Wi-Fi coverage area are wider for the lower data rate bands than for the higher data rate bands. In addition, the uplink data rate is a measure of the uplink signal strength that is received by the Wi-Fi access point which is not directly available to the mobile device.

A combination of the RSSI and the data rates may be utilized in some cases to indicate the quality of the Wi-Fi connection. In other cases, link data rates may be used as Wi-Fi connection quality indicators since these parameters factor in both congestion and radio characteristics. For example, if both the uplink and downlink data rates are relatively high (i.e., one of the higher numbers in 802.11 defined rates or equivalently not one of the lowest data rates), then the link is expected to be stable and likely to provide a quality Wi-Fi connection for the near future. However, if the uplink data rate is towards the lower end of the range of defined rates (e.g., one of two lowest data rates) and there are other indicators, such as a decreasing trend and/or detected user activity (as described below), then the risk of link failure will likely be higher.

The trend in the RSSI may be used as an additional indicator over and above link data rate. If the RSSI trend is proceeding significantly downwards, then the risk of call degradation and disconnection may be increased. It is important to note that for many devices the RSSI value delivered by the low level software is an average of the signal strength computed over several seconds. This would be of limited value in determining a useful trend and so RSSI based on shorter interval averaging, for example, on the order of a second, would be more optimal for the class of handoff decision algorithms. A variety of other measured parameters related to the Wi-Fi connection may also be useful indicators of connection degradation risk, such as the transmission error rate which increases with decreasing radio signal quality. Many implementations of Wi-Fi drivers will perform a scan to discover additional access points when they detect indications of declining quality in the current Wi-Fi connection.

The media stack 715 can provide a variety of indications of the current call quality. The RTP (Real-time Transport Protocol) stream typically employs several measures to respond to adverse conditions on the network connection with the goal of reducing the latency and jitter experience by RTP packets. Therefore, the activation of these measures can also serve as an indication of worsening conditions on a current connection. The degradation of conditions can result from a wide variety of factors such as congestion and/or insufficient bandwidth on the network path taken by the media stream. Another indication of current call quality is the packet loss rate and error concealment by the media stack.

Exemplary relevant parameters related to the RTP packet stream include: average round trip delay in milliseconds for RTP packets (e.g., 100 msec or less is acceptable with a threshold maximum of approximately 300 msec); average packet loss rate (e.g., a threshold of 0.1 and an optimal value of 0.05); jitter (e.g., a threshold maximum of 20); healer concealed ratio (e.g., 0.03 is an optimal threshold). The healer concealed ratio relates to a technique to smooth out abrupt transitions that can be the result of lost RTP packets or jitter. Measured/observed values outside of the illustrative acceptable ranges typically indicate a higher risk of a link failure.

The transport stack 720 typically maintains a variety of parameters for an ongoing connection such as packet retransmission rate, packet queue lengths, round trip delays and variability, and the like. Such parameters can typically be maintained across all data flows (e.g., HTTP connections) and not just the RTP flow for the call. One or more of these parameters can provide indication of changes in the conditions that could contribute to a call's degradation and/or link failure.

Sensors such as accelerometers, barometers, and gyroscope devices disposed in the mobile device can be used by the activity inference engine 735 to detect whether the user of the device is stationary or moving (e.g., walking, running, or moving in a vehicle). Estimates of the velocity of the motion may also be obtained or measured in some cases. Detected activity can be used to try to indicate the potential of a call being degraded or dropped. For example, if changes in the RSSI or the link data rate indicate that the user is moving away from a Wi-Fi access point, then the risk of a dropped call becomes higher if the user is running which indicates a quicker handoff is likely desirable. Similarly, if the activity detection indicates that the user is moving in a vehicle, then the handoff should be attempted immediately since such rapid movement away from the Wi-Fi access point typically represents a major increase in the estimated risk of a dropped or unacceptably degraded call. Another example of activity-related information may include the detection of the mobile device's association with a Bluetooth connection that is maintained in an automobile. Such Bluetooth association may indicate increasing risk that the user is moving away from the Wi-Fi access point.

The present arrangement for deciding when to hand off a call away from a Wi-Fi connection is to use a combination of Wi-Fi related measurements and trends with the media and transport stack and activity indicators. Accordingly, a handoff decision algorithm can be any function of the various observed parameters and related risk threshold values described above. A particular class of handoff decision algorithms is now presented. It will be appreciated that principles presented here can also be applied to other classes of handoff decision algorithms as may be needed to meet the needs of a particular implementation of call handoff initiation.

The class of handoff decision algorithms is based on measuring and tracking a number of characteristics. Examples of characteristics are the uplink and downlink data rates for the Wi-Fi connection, the jitter for the media stream, activity indications, and so on.

An illustrative example of a handoff decision algorithm that belongs to the present class identifies call scenarios in which the link data rate is in the lowest allowed rate band using the following logic.

Using Wi-Fi link data rate measurements:

A. If the data rate for both uplink and downlink is higher than the lowest level of the basic rate levels (for 802.11a and g, the lowest level is 6 Mbps; for 802.11b, the lowest level is 1 Mbps), then conclude that there is a low risk of imminent link failure. In this case, the trend of the link data rates can also be tracked to look for transitions in the data rate bands. A transition into the lowest band would indicate the applicability of case B below and its corresponding logic.

B. If either of the uplink or downlink data rates is in the lowest data rate band, then this indicates a high level of risk of link failure. For example, the link is experiencing some combination of radio degradation and/or congestion, both of which indicate an imminent risk to call quality and that the mobile device is located in the outermost band of Wi-Fi range. Other measured parameters may also be examined, such as the media stack and activity indicators:

i) If the uplink data rate is in the lowest band and if the activity detection shows that the user is moving, then the risk of link failure is substantially increased and a handoff is indicated.

ii) If the media stack indicates significant jitter buffer adjustment or packet loss over a time period, then this indicates that the end-to-end data connection is experiencing congestion and delays. Depending on the level of jitter buffer adjustment, the call risk is increased.

If the call risk exceeds a risk threshold then the call handoff may be initiated to an alternative connection for which the long term trend information serves as the decision basis.

Figure 8:
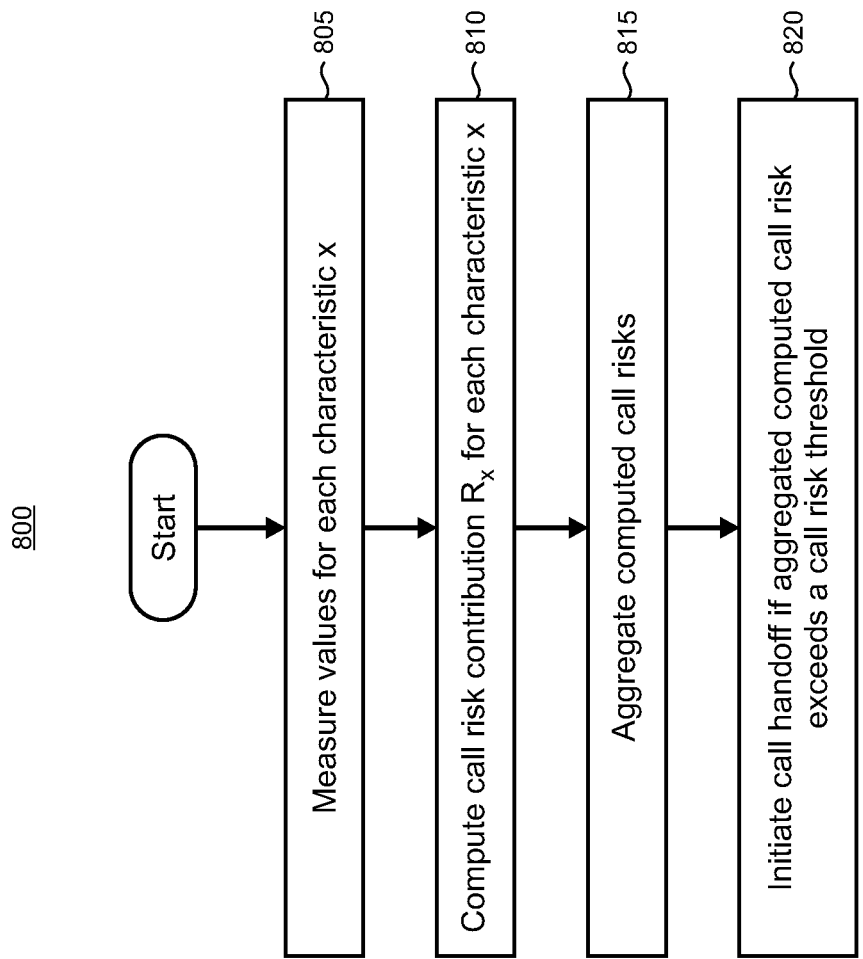
FIG. 8 is a flowchart of an illustrative method for initiating a call handoff in a hybrid network.
Figure 9:
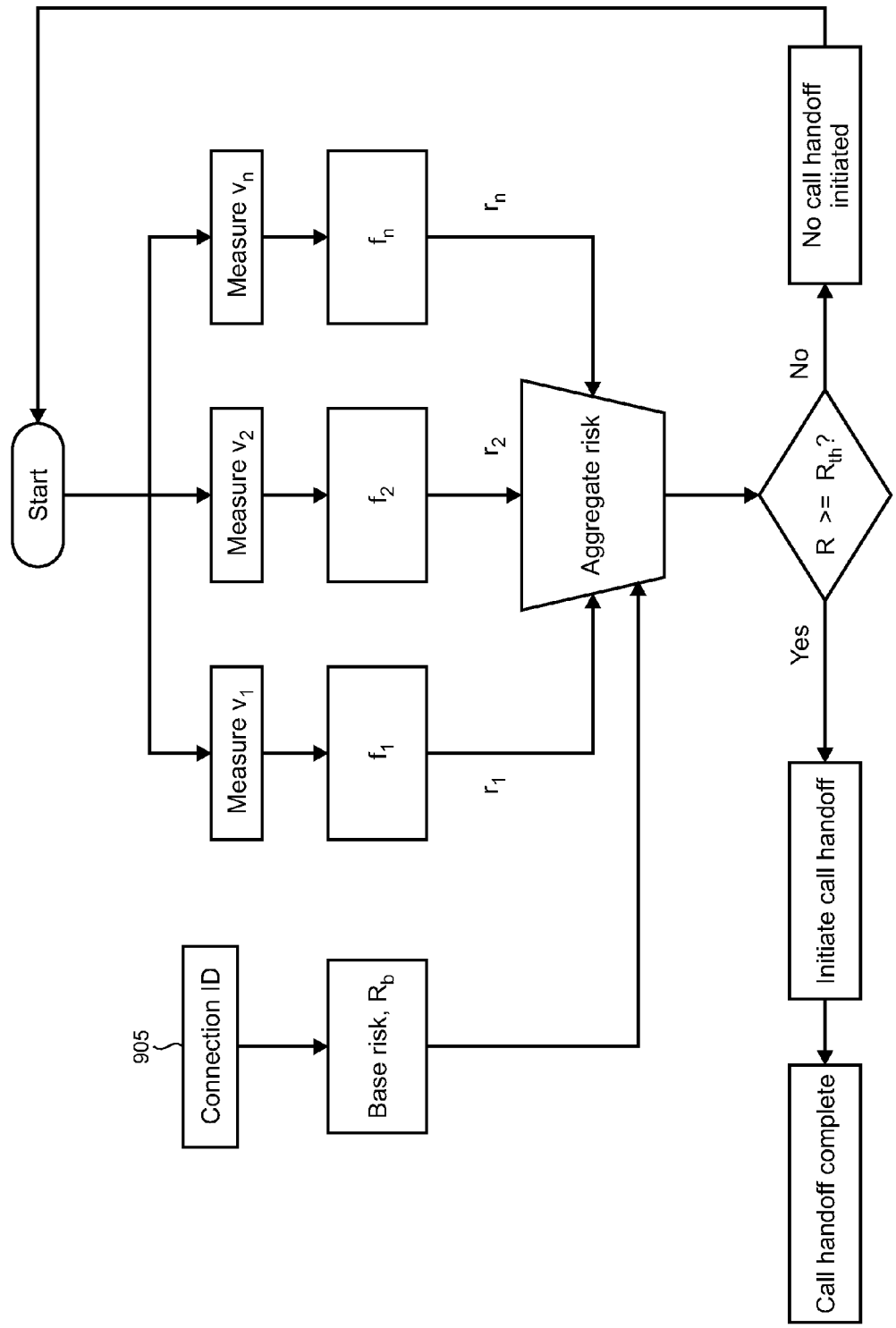
FIG. 9 is a diagram that illustrates the method shown in the flowchart in FIG. 8.

The exemplary handoff decision algorithm described above may be generalized to a class of algorithms that are based on measuring and tracking a number of characteristics as shown in the flowchart of method 800 in FIG. 8 and the corresponding diagram in FIG. 9.

Using $v_x$ to represent a measured value of characteristic x, the call risk contribution of a characteristic x is a non-negative number represented by $r_x$ that is computed by performing some function/operation $f_x$ to the measured value of the characteristic. Thus $r_x = f_x(v_x)$. The exact operation $f_x$ could be dependent on the measured values of other characteristics as well.

For each characteristic, there is a set of one or more thresholds $t_x^{(i)}$ each having an associated action indicator $a_x^{(i)}$. Equivalently, for each characteristic and its associated set of thresholds and actions, a risk function $f_x$ may be used to compute the call risk contributed by x. Similarly for the uplink data rate characteristic, UDR, thresholds equal to the two lowest bands of the applicable data rates in the data rate scales for the version of 802.11 in use are employed. For a data link rate above these two threshold values, the call risk contribution is $r_{UDR}=0$. For the two lower bands, the call risk contributions would typically be higher for the lower of the two bands.

A given decision will use a particular algorithm from this class of decision algorithms and a particular risk thresholds set. Thus, as with the environmental context, as shown at step 805 in FIG. 8, the value $v_x$ for each characteristic x is measured. The call risk contributions $R_x$ are computed at step 810 by application of function $f_x$ to the measured characteristic. At step 815, together with the base risk $R_b$ for a particular cellular radio connection ID (element 905 in FIG. 9), computed call risks are aggregated over all x:

Aggregated computed call risk $R = R_b +$ Aggregation($f_x(v_x)$) over all x)

The base risk for each observed connection ID alternative may be obtained from crowd-sourced observations of the results of using various radio connections from the point of view of the call quality that was obtained over those connections.

If the aggregated computed call risk exceeds a risk threshold, $R >= R_{th}$, then the decision is made to initiate a handoff of the current call identified by the connection ID at step 820. If the aggregated computed risk is less than the risk threshold, then no handoff is initiated and control is returned to start so that additional characteristics can then be measured and the method 800 repeated.

The call handoff process may incorporate some hysteresis in order to avoid thrashing of call handoff away from and back to Wi-Fi in some implementations. In addition, the handoff process typically involves ensuring that an alternative connection having adequate quality is available to the mobile device.

Figure 10:
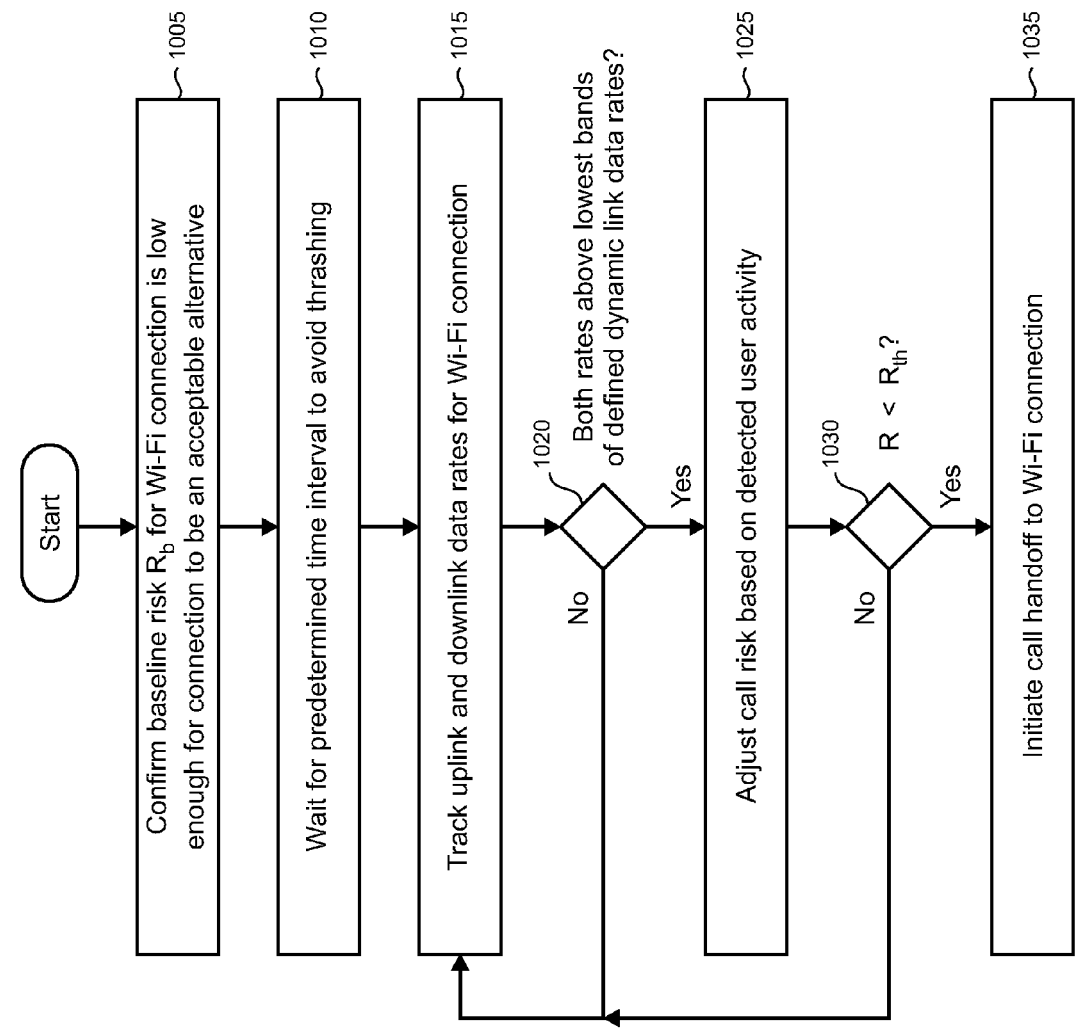
FIG. 10 is a flowchart of an illustrative method for initiating a call handoff from a cellular connection to a Wi-Fi connection.

For a handoff of a call from a cellular connection to a Wi-Fi connection the applicable handoff decision algorithms may be similar to those used in the Wi-Fi to cellular case discussed above. Here, a typical scenario comprises an ongoing call on a cellular connection during which a less expensive Wi-Fi connection becomes available. The mobile device needs to decide when it should hand off the call to the Wi-Fi connection while avoiding a premature handoff that could result in a further handoff back to a cellular connection, for example because the mobile device was only peripherally and temporally in the range of the Wi-Fi connection. An illustrative handoff decision algorithm from the cellular connection to Wi-Fi is shown in FIG. 10. It is noted that the handoff decision algorithm may also be applied to scenarios in which a call is handed off from a wireline (i.e., PSTN) connection to a Wi-Fi connection.

At step 1005, the baseline risk, $R_b$, for the Wi-Fi connection under consideration is confirmed to be low enough for the connection to be an acceptable alternative. If the Wi-Fi connection is acceptable, then a wait period is typically imposed for some time interval to avoid thrashing at step 1010. That is, some hysteresis may be incorporated into the algorithm to avoid excessive handoffs when in a transit-through situation in which a mobile device is only within Wi-Fi coverage area for a short period of time, for example while moving through an area while the user is walking or driving. At step 1015, the uplink and downlink data for the Wi-Fi connection are tracked. In some cases, the tracking may involve probing by the mobile device to the Wi-Fi access point. In some cases, other indicia of Wi-Fi link quality may also be utilized (not shown in FIG. 10).

At decision block 1020, if both the link data rates are higher than the lowest bands of the dynamic link data rates, then the connection handoff may be warranted, otherwise the uplink and downlink data rates can continue to be tracked. The data rates being above the lowest band indicates that the mobile device is not likely in the outer periphery of the Wi-Fi coverage area. The handoff decision can be modulated by also observing the user's activity indication at step 1025. If a fast movement of the user is indicated, then the data rate trends can be used to determine if the user is moving inwards or outwards from the Wi-Fi coverage area and thus the call risk can be amended down or upwards as appropriate. At decision block 1030, if the call risk is less than a risk threshold, $R < R_{th}$, then a call handoff to the Wi-Fi connection can be initiated at step 1035.

Figure 11:
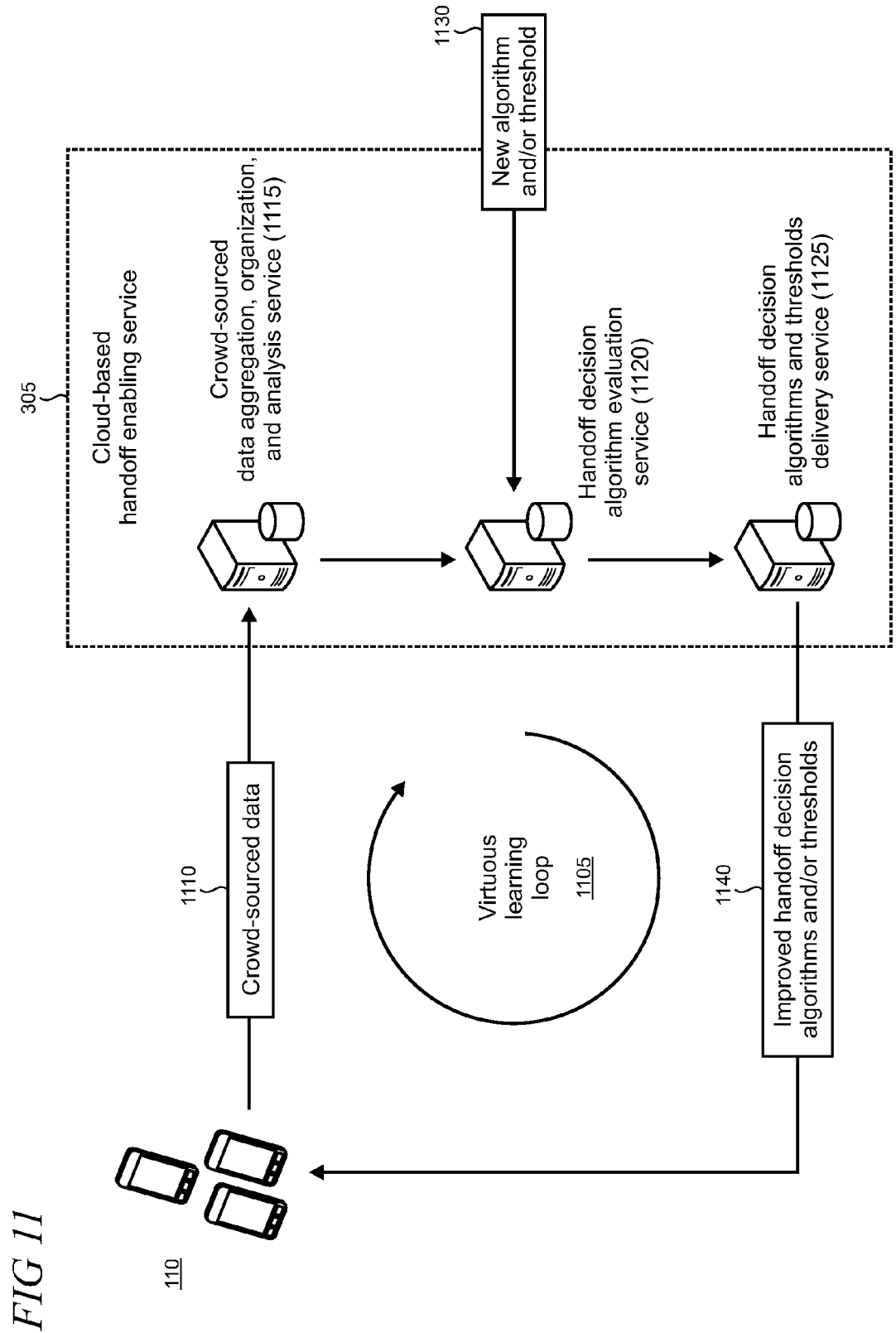
FIG. 11 shows an illustrative virtuous learning loop.
Figure 12:
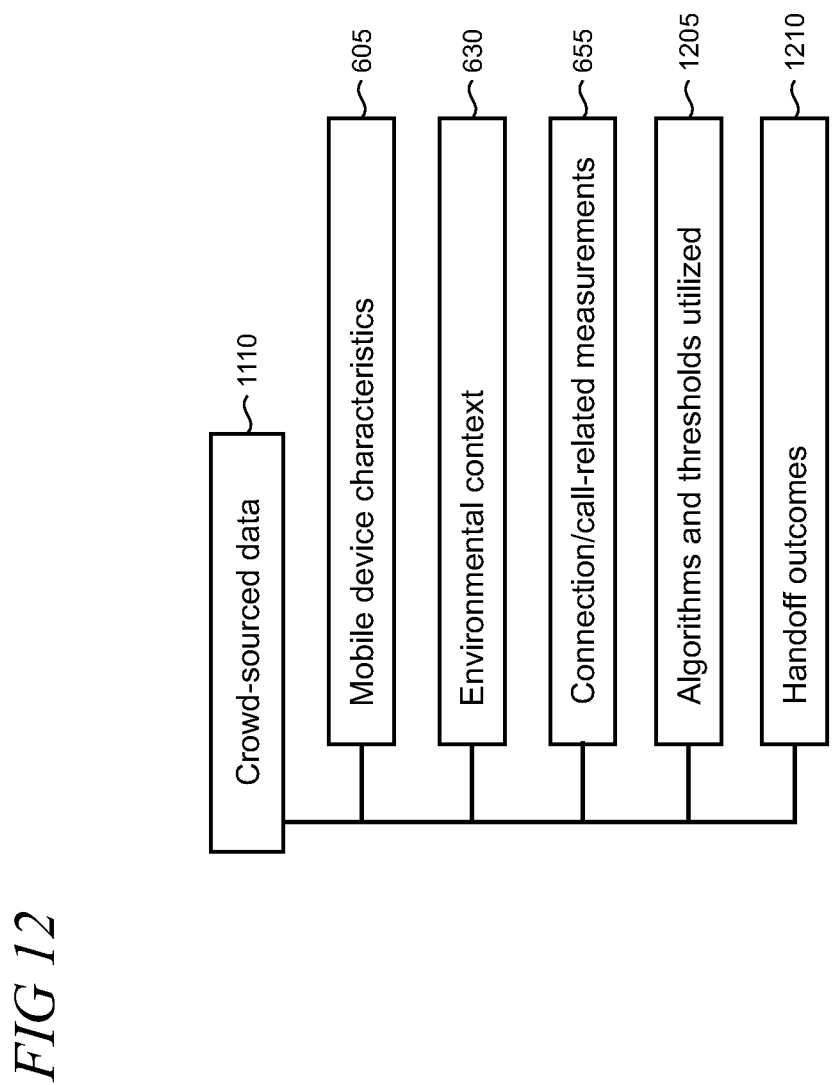
FIG. 12 shows an illustrative taxonomy of crowd-sourced data.

As shown in FIG. 11, the mobile devices 110 and the cloud-based handoff enabling service 305 can participate in a virtuous learning loop 1105 to improve call handoff outcomes. Data 1110 is crowd-sourced from the mobile devices and provided to the cloud-based handoff enabling service. The crowd-sourced data 1110 includes various types of information that may be captured during a time interval that starts shortly before a call handoff is initiated and ends sometime after the handoff is completed. As shown in FIG. 12, the information provided with the crowd-sourced data 1110 can include mobile device characteristics 605 (FIG. 6), environmental context 630, call/connection-related measurements 655, call handoff algorithms and risk thresholds utilized for the handoff 1205, and handoff outcomes 1210 (e.g., whether as a result of the handoff attempt the call was successfully handed off, perceptibly interrupted, dropped, handed off prematurely resulting, for example, in thrashing, etc.).

Returning to FIG. 11, the cloud-based handoff enabling service 305 includes several component services including a crowd-sourced data aggregation, organization, and analysis service 1115, a handoff decision algorithm evaluation service 1120, and a handoff decision algorithms and risk thresholds delivery service 1125.

The crowd-sourced data aggregation, organization, and analysis service 1115 is arranged to accumulate the crowd-sourced data and then analyze the accumulated data to determine statistical measures of outcomes as correlative trends. In particular, the service 1115 may estimate the statistical occurrence of dropped calls, perceptible interruptions, premature handoffs and/or other outcomes (e.g., successful handoffs and the connection characteristics associated therewith) and correlate them to the types of information collected from the crowd-sourced data 1110. For example, dropped calls and/or premature handoffs may each be correlated to the particular connection from which the call was handed off and at what time (e.g., day of week, time of day, etc.) and where (e.g., location or geographic coordinates) the handoff occurred.

The handoff decision algorithm evaluation service 1120 is arranged to evaluate the effectiveness of the particular handoff decision algorithms and risk thresholds utilized against crowd-sourced descriptions and/or measurements for past handoff attempts. The evaluation's objective is to reduce handoff-related dropped calls as well as unnecessary/premature handoffs. The evaluation may be performed periodically. Results from the evaluation can be classified according to various patterns that emerge with regard to a particular cellular beacons as well as location and time factors for a given mobile device. New algorithms and/or risk thresholds 1130 can be run against the accumulated crowd-sourced data so that predicted handoff decisions are computed and compared against the actual outcome statistics to evaluate potential algorithm and risk threshold improvements.

The handoff decision algorithm and risk threshold delivery service 1125 can be used to deliver improved algorithms and/or risk thresholds 1140 to the mobile device in order to close the virtuous learning loop 1105. It is noted that the virtuous learning loop can be configured to run with or without ongoing active calls.

In typical implementations, the new algorithms and/or risk thresholds are applicable to particular environmental contexts such as the location of the mobile device when a handoff decision is being attempted, the time of day and/or day of week, the particular connection being considered, and various combinations thereof. Thus, the service 1125 can provide optimized algorithms and/or risk thresholds for a variety of particular environmental contexts to the mobile device which can load and run to initiate the handoff decision when a given context is encountered.

Figure 13:
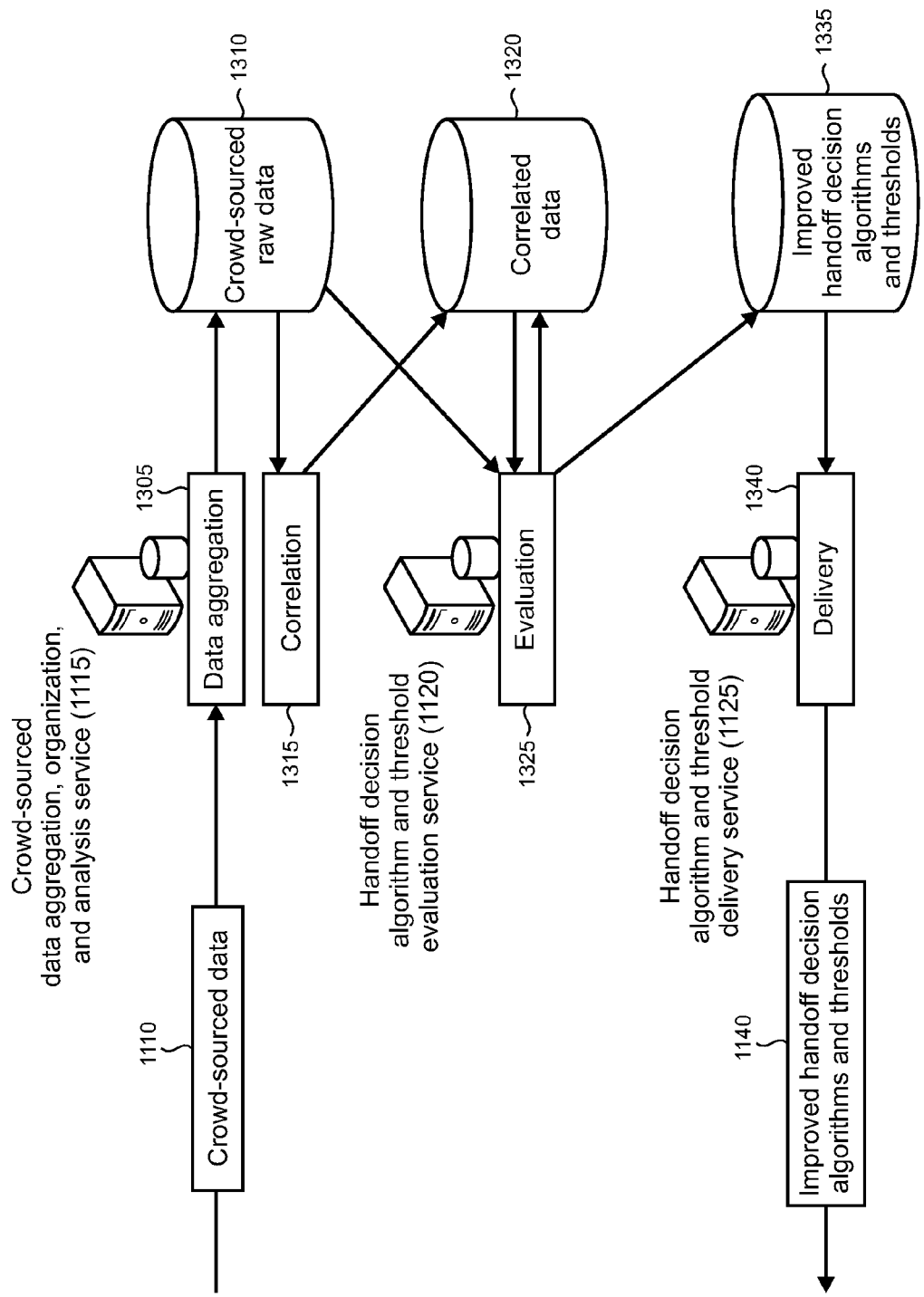
FIG. 13 shows illustrative details of various cloud-based services that are used to implement the virtuous learning loop shown in FIG. 11.

FIG. 13 shows illustrative details of each of the services utilized in the cloud-based handoff enabling service. The crowd-sourced data aggregation, organization, and analysis service 1115 exposes a data aggregation component 1305 which aggregates the crowd-sourced data 1110 in crowd-sourced raw data store 1310. A correlation component 1315 reads the raw crowd-sourced data from the store 1310 and performs various statistical analyses and correlations between handoff outcomes and connections, as described above. The correlation component 1315 writes correlation results to a correlated data store 1320.

The handoff decision algorithm and risk threshold evaluation service 1120 exposes an evaluation component 1325 that is configured to read the correlation results from the store 1320. The effectiveness of particular algorithms and risk thresholds is evaluated against descriptions and/or measurements for past handoff attempts from the crowd-sourced raw data store 1310. Improved handoff decision algorithms and risk thresholds are written to a store 1335. The aggregated service elements provide a machine learning capability for improving handoff decision algorithms and thresholds. A delivery component 1340 exposed by the handoff decision algorithm and threshold service provides the improved algorithms and risk thresholds to the mobile devices as part of the virtuous learning loop 1105 (FIG. 11).

Figure 14:
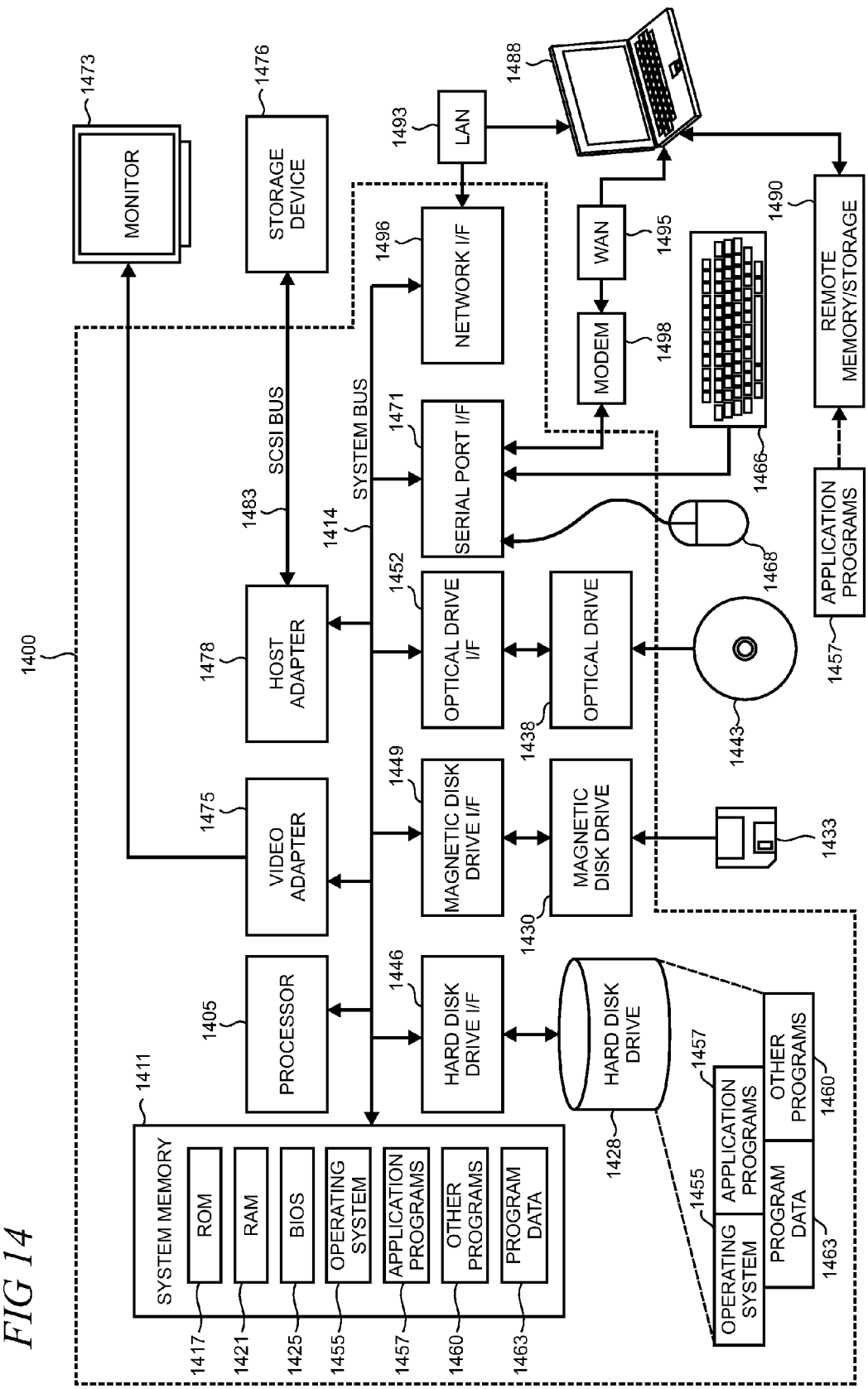
FIG. 14 is a simplified block diagram of an illustrative computer system such as a personal computer ("PC") that may be used in part to facilitate the present call handoff initiation.

FIG. 14 is a simplified block diagram of an illustrative computer system 1400 such as a personal computer (PC), client machine, or server with which the present call handoff initiation may be implemented. Computer system 1400 includes a processor 1405, a system memory 1411, and a system bus 1414 that couples various system components including the system memory 1411 to the processor 1405. The system bus 1414 may be any of several types of bus structures including a memory bus or memory controller, a peripheral bus, or a local bus using any of a variety of bus architectures. The system memory 1411 includes read only memory (ROM) 1417 and random access memory (RAM) 1421. A basic input/output system (BIOS) 1425, containing the basic routines that help to transfer information between elements within the computer system 1400, such as during startup, is stored in ROM 1417. The computer system 1400 may further include a hard disk drive 1428 for reading from and writing to an internally disposed hard disk (not shown), a magnetic disk drive 1430 for reading from or writing to a removable magnetic disk 1433 (e.g., a floppy disk), and an optical disk drive 1438 for reading from or writing to a removable optical disk 1443 such as a CD (compact disc), DVD (digital versatile disc), or other optical media. The hard disk drive 1428, magnetic disk drive 1430, and optical disk drive 1438 are connected to the system bus 1414 by a hard disk drive interface 1446, a magnetic disk drive interface 1449, and an optical drive interface 1452, respectively. The drives and their associated computer-readable storage media provide non-volatile storage of computer-readable instructions, data structures, program modules, and other data for the computer system 1400. Although this illustrative example includes a hard disk, a removable magnetic disk 1433, and a removable optical disk 1443, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present call handoff initiation. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk 1428, magnetic disk 1433, optical disk 1443, ROM 1417, or RAM 1421, including an operating system 1455, one or more application programs 1457, other program modules 1460, and program data 1463. A user may enter commands and information into the computer system 1400 through input devices such as a keyboard 1466 and pointing device 1468 such as a mouse. Other input devices (not shown) may include a microphone, joystick, game pad, satellite dish, scanner, trackball, touchpad, touch screen, touch-sensitive device, voice-command module or device, user motion or user gesture capture device, or the like. These and other input devices are often connected to the processor 1405 through a serial port interface 1471 that is coupled to the system bus 1414, but may be connected by other interfaces, such as a parallel port, game port, or universal serial bus ("USB"). A monitor 1473 or other type of display device is also connected to the system bus 1414 via an interface, such as a video adapter 1475. In addition to the monitor 1473, personal computers typically include other peripheral output devices (not shown), such as speakers and printers. The illustrative example shown in FIG. 14 also includes a host adapter 1478, a Small Computer System Interface ("SCSI") bus 1483, and an external storage device 1476 connected to the SCSI bus 1483.

The computer system 1400 is operable in a networked environment using logical connections to one or more remote computers, such as a remote computer 1488. The remote computer 1488 may be selected as another personal computer, a server, a router, a network PC, a peer device, or other common network node, and typically includes many or all of the elements described above relative to the computer system 1400, although only a single representative remote memory/storage device 1490 is shown in FIG. 14. The logical connections depicted in FIG. 14 include a local area network ("LAN") 1493 and a wide area network ("WAN") 1495. Such networking environments are often deployed, for example, in offices, enterprise-wide computer networks, intranets, and the Internet.

When used in a LAN networking environment, the computer system 1400 is connected to the local area network 1493 through a network interface or adapter 1496. When used in a WAN networking environment, the computer system 1400 typically includes a broadband modem 1498, network gateway, or other means for establishing communications over the wide area network 1495, such as the Internet. The broadband modem 1498, which may be internal or external, is connected to the system bus 1414 via a serial port interface 1471. In a networked environment, program modules related to the computer system 1400, or portions thereof, may be stored in the remote memory storage device 1490. It is noted that the network connections shown in FIG. 14 are illustrative and other means of establishing a communications link between the computers may be used depending on the specific requirements of an application of call handoff initiation in hybrid networks.

Figure 15:
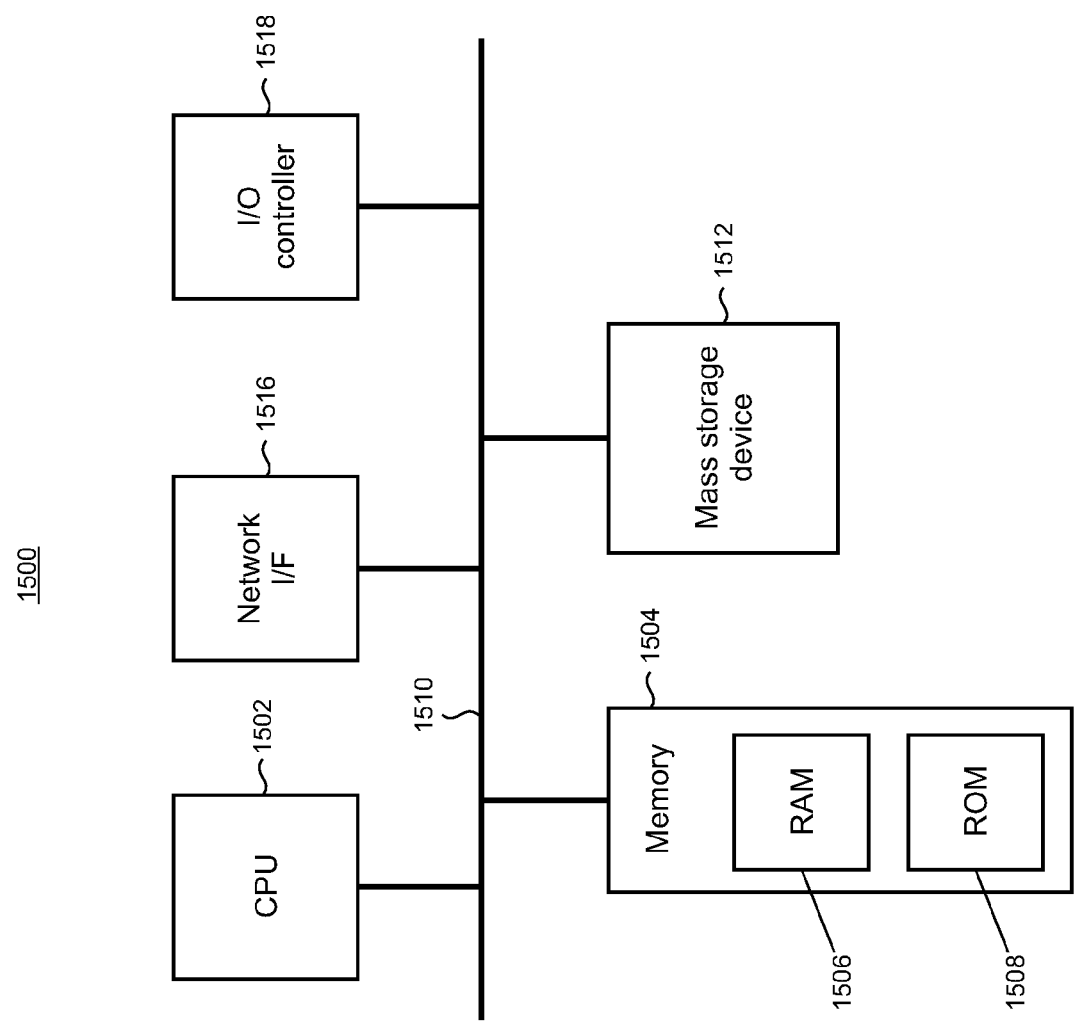
FIG. 15 shows a block diagram of an illustrative device that may be used in part to facilitate the present call handoff initiation.

FIG. 15 shows an illustrative architecture 1500 for a device capable of executing the various components described herein for providing voice call continuity. Thus, the architecture 1500 illustrated in FIG. 15 shows an architecture that may be adapted for a server computer, mobile phone, a PDA (personal digital assistant), a smartphone, a desktop computer, a netbook computer, a tablet computer, GPS (Global Positioning System) device, gaming console, and/or a laptop computer. The architecture 1500 may be utilized to execute any aspect of the components presented herein.

The architecture 1500 illustrated in FIG. 15 includes a CPU 1502, a system memory 1504, including a RAM 1506 and a ROM 1508, and a system bus 1510 that couples the memory 1504 to the CPU 1502. A basic input/output system containing the basic routines that help to transfer information between elements within the architecture 1500, such as during startup, is stored in the ROM 1508. The architecture 1500 further includes a mass storage device 1512 for storing software code or other computer-executed code that is utilized to implement applications, the file system, and the operating system.

The mass storage device 1512 is connected to the CPU 1502 through a mass storage controller (not shown) connected to the bus 1510. The mass storage device 1512 and its associated computer-readable storage media provide non-volatile storage for the architecture 1500.

Although the description of computer-readable storage media contained herein refers to a mass storage device, such as a hard disk or CD-ROM drive, it should be appreciated by those skilled in the art that computer-readable storage media can be any available storage media that can be accessed by the architecture 1500.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), BLU-RAY, or other optical storage, magnetic cassettes, magnetic tape, magnetic disk storage or other magnetic storage devices, or any other medium which can be used to store the desired information and which can be accessed by the architecture 1500.

According to various embodiments, the architecture 1500 may operate in a networked environment using logical connections to remote computers through a network. The architecture 1500 may connect to the network through a network interface unit 1516 connected to the bus 1510. It should be appreciated that the network interface unit 1516 also may be utilized to connect to other types of networks and remote computer systems. The architecture 1500 also may include an input/output controller 1518 for receiving and processing input from a number of other devices, including a keyboard, mouse, or electronic stylus (not shown in FIG. 15). Similarly, the input/output controller 1518 may provide output to a display screen, a printer, or other type of output device (also not shown in FIG. 15).

It should be appreciated that the software components described herein may, when loaded into the CPU 1502 and executed, transform the CPU 1502 and the overall architecture 1500 from a general-purpose computing system into a special-purpose computing system customized to facilitate the functionality presented herein. The CPU 1502 may be constructed from any number of transistors or other discrete circuit elements, which may individually or collectively assume any number of states. More specifically, the CPU 1502 may operate as a finite-state machine, in response to executable instructions contained within the software modules disclosed herein. These computer-executable instructions may transform the CPU 1502 by specifying how the CPU 1502 transitions between states, thereby transforming the transistors or other discrete hardware elements constituting the CPU 1502.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 1500 in order to store and execute the software components presented herein. It also should be appreciated that the architecture 1500 may include other types of computing devices, including handheld computers, embedded computer systems, smartphones, PDAs, and other types of computing devices known to those skilled in the art. It is also contemplated that the architecture 1500 may not include all of the components shown in FIG. 15, may include other components that are not explicitly shown in FIG. 15, or may utilize an architecture completely different from that shown in FIG. 15.

Figure 16:
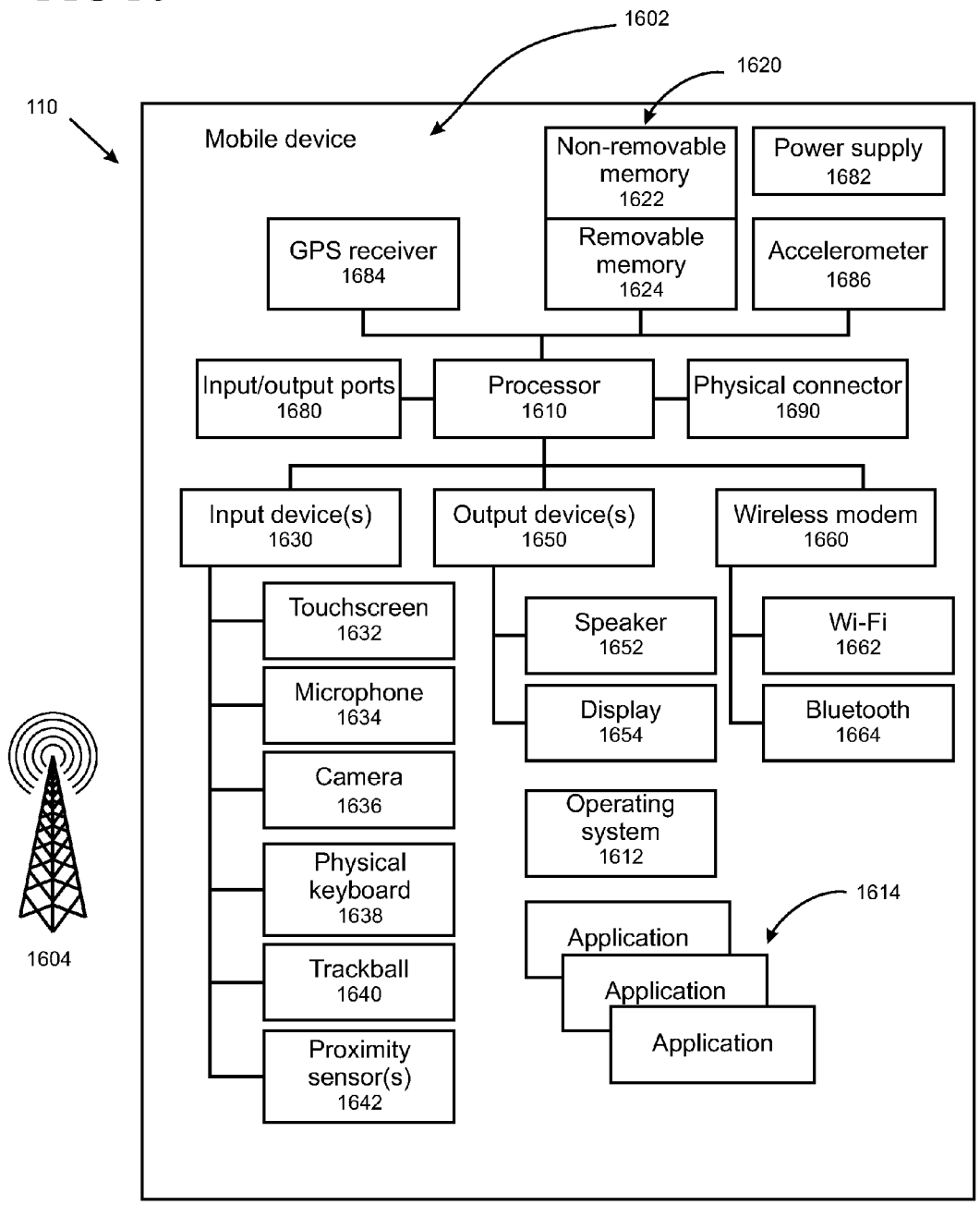
FIG. 16 is a block diagram of an illustrative mobile device.

FIG. 16 is a functional block diagram of an illustrative mobile device 110 such as a mobile phone or smartphone including a variety of optional hardware and software components, shown generally at 1602. Any components 1602 in the mobile device can communicate with any other component, although, for ease of illustration, not all connections are shown. The mobile device can be any of a variety of computing devices (e.g., cell phone, smartphone, handheld computer, Personal Digital Assistant (PDA), etc.) and can allow wireless two-way communications with one or more mobile communication networks 1604, such as a cellular or satellite network.

The illustrated mobile device 110 can include a controller or processor 1610 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 1612 can control the allocation and usage of the components 1602, including power states, above-lock states, and below-lock states, and provides support for one or more application programs 1614. The application programs can include common mobile computing applications (e.g., image-capture applications, email applications, calendars, contact managers, web browsers, messaging applications), or any other computing application.

The illustrated mobile device 110 can include memory 1620. Memory 1620 can include non-removable memory 1622 and/or removable memory 1624. The non-removable memory 1622 can include RAM, ROM, Flash memory, a hard disk, or other well-known memory storage technologies. The removable memory 1624 can include Flash memory or a Subscriber Identity Module (SIM) card, which is well known in GSM (Global System for Mobile communications) systems, or other well-known memory storage technologies, such as "smart cards." The memory 1620 can be used for storing data and/or code for running the operating system 1612 and the application programs 1614. Example data can include web pages, text, images, sound files, video data, or other data sets to be sent to and/or received from one or more network servers or other devices via one or more wired or wireless networks.

The memory 1620 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), BLU-RAY, or other optical storage, magnetic cassettes, magnetic tape, magnetic disk storage or other magnetic storage devices, or any other medium which can be used to store the desired information and which can be accessed by the mobile device 110.

The memory 1620 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device 110 can support one or more input devices 1630; such as a touch screen 1632; microphone 1634 for implementation of voice input for voice recognition, voice commands and the like; camera 1636; physical keyboard 1638; trackball 1640; and/or proximity sensor 1642; and one or more output devices 1650, such as a speaker 1652 and one or more displays 1654. Other input devices (not shown) using gesture recognition may also be utilized in some cases. Other possible output devices (not shown) can include piezoelectric or haptic output devices. Some devices can serve more than one input/output function. For example, touch screen 1632 and display 1654 can be combined into a single input/output device.

A wireless modem 1660 can be coupled to an antenna (not shown) and can support two-way communications between the processor 1610 and external devices, as is well understood in the art. The modem 1660 is shown generically and can include a cellular modem for communicating with the mobile communication network 1604 and/or other radio-based modems (e.g., Bluetooth 1664 or Wi-Fi 1662). The wireless modem 1660 is typically configured for communication with one or more cellular networks, such as a GSM network for data and voice communications within a single cellular network, between cellular networks, or between the mobile device and a public switched telephone network (PSTN).

The mobile device can further include at least one input/output port 1680, a power supply 1682, a satellite navigation system receiver 1684, such as a Global Positioning System (GPS) receiver, an accelerometer 1686, a gyroscope (not shown), and/or a physical connector 1690, which can be a USB port, IEEE 1394 (FireWire) port, and/or an RS-232 port. The illustrated components 1602 are not required or all-inclusive, as any components can be deleted and other components can be added.

Based on the foregoing, it should be appreciated that technologies for call handoff initiation in hybrid networks have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A method for improving decision making for handoff of calls between different connection types, the calls carried on a hybrid network comprising loosely coupled network portions, the network portions including at least a mobile operator network and a VoIP (Voice over Internet Protocol) network, the method comprising the steps of:
    implementing a virtuous learning loop between a handoff decision enabling service and each of a plurality of mobile devices, the virtuous learning loop being configured to provide feedback from the mobile devices to the handoff decision enabling service;
    receiving crowd-sourced data from the mobile devices, the crowd-sourced data comprising outcomes for past attempts at handoffs for calls and parameters associated with each handoff outcome, the parameters including at least one of environmental context of a mobile device in which a handoff was attempted or measured characteristics of network connections available to the mobile device prior to the attempted handoff;
    evaluating a call handoff algorithm to determine the call handoff algorithm's performance under conditions described by the crowd-sourced data;
    evaluating a risk threshold to determine the risk threshold's performance under conditions described by the crowd-sourced data; and
    delivering the handoff algorithm or risk threshold to the mobile devices over the virtuous learning loop.

2. The method of claim 1 further including a step of operating the handoff decision enabling service as a part of the VoIP network.

3. The method of claim 2 further including a step of aggregating crowd-sourced data from the plurality of mobile devices in which the crowd-sourced data is collected on a mobile device over a pre-determined time interval that begins at a start time prior to a handoff attempt and ends at an end time after the handoff attempt.

4. The method of claim 1 in which the hybrid network further includes a PSTN (Public Switched Telephone Network) portion.

5. The method of claim 1 in which a handoff outcome includes one of successful handoff, dropped call, perceptible interruption, or premature handoff.

6. The method of claim 1 further including a step of utilizing a variety of types of information in the crowd-sourced data, the crowd-sourced data types including one of mobile device characteristics, connection measurements, call-related measurements, or environmental context data.

7. The method of claim 6 in which the connection measurements comprise measurements of Wi-Fi connection characteristics or measurements of cellular connection characteristics.

8. The method of claim 6 in which the call-related measurements comprise measurements of media stack parameters or measurements of transport stack parameters.

9. The method of claim 1 further including a step of optimizing the handoff algorithm or risk threshold to a given environmental context for a mobile device, the environmental context including one of a time of day or day of week in which a handoff is being attempted, a location of the mobile device at which the handoff is being attempted, or a type of network connection to which a call is being handed off.

10. A mobile device, comprising:
    at least one processor; and
    memory operatively coupled to the processor and storing computer-readable instructions that, when executed by the at least one processor, implement call handoff initiation components that perform a method comprising the steps of:
        measuring characteristics of each of multiple connections to a hybrid network having loosely coupled network portions including a mobile operator network, and a VoIP (Voice over Internet Protocol) network, each of the multiple connections being of a different type,
        collecting data describing an environmental context in which a call handoff between the multiple connections is attempted,
        sending measured connection characteristics and environmental context data to a handoff decision enabling service as a part of data crowd-sourced from a population of mobile devices having access to the hybrid network to make calls;
        receiving a handoff decision algorithm or a risk threshold from the handoff decision enabling service, the handoff decision algorithm and risk threshold being generated in view of the crowd-sourced data, and
        running the received handoff decision algorithm or applying the received risk threshold when attempting a call handoff.

11. The mobile device of claim 10 in which the method further includes a step of sending characteristics of the mobile device to the handoff decision enabling service, the characteristics including at least one of mobile device type, mobile device model, or operating system instantiated on the mobile device.

12. The mobile device of claim 10 in which the received handoff decision algorithm is optimized to a particular environmental context and the handoff decision algorithm is run or the risk threshold applied when the particular environmental context is applicable.

13. The mobile device of claim 10 in which the handoff decision enabling service is cloud-based.

14. The mobile device of claim 10 in which the handoff decision enabling service is implemented at least in part in the VoIP network portion.

* * * * *